United States Patent
Furukawa et al.

(10) Patent No.: US 7,193,948 B2
(45) Date of Patent: Mar. 20, 2007

(54) OPTICAL RECORDING MEDIUM, METHOD FOR RECORDING ON OPTICAL RECORD MEDIUM, AND APPARATUS FOR RECORDING ON OPTICAL RECORD MEDIUM

(75) Inventors: Shigeaki Furukawa, Kadoma (JP); Kenichi Nishiuchi, Hirakata (JP); Tetsuya Akiyama, Hirakata (JP); Kenji Narumi, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 982 days.

(21) Appl. No.: 10/148,797

(22) PCT Filed: Oct. 3, 2001

(86) PCT No.: PCT/JP01/08690

§ 371 (c)(1),
(2), (4) Date: Sep. 5, 2002

(87) PCT Pub. No.: WO02/29791

PCT Pub. Date: Apr. 11, 2002

(65) Prior Publication Data
US 2003/0058771 A1 Mar. 27, 2003

(30) Foreign Application Priority Data
Oct. 5, 2000 (JP) ............................. 2000-305818

(51) Int. Cl.
*G11B 00/45* (2006.01)

(52) U.S. Cl. ................. 369/59.11; 369/47.52; 369/47.55; 369/275.4

(58) Field of Classification Search ............. None
See application file for complete search history.

(56) References Cited

U.S. PATENT DOCUMENTS

| 5,490,126 | A | | 2/1996 | Furumiya et al. |
| 5,745,467 | A | * | 4/1998 | Sakaue et al. ........... 369/59.11 |
| 5,756,265 | A | | 5/1998 | Abe et al. |
| 6,345,026 | B1 | * | 2/2002 | Furukawa et al. ....... 369/59.11 |

(Continued)

FOREIGN PATENT DOCUMENTS

EP 517490 12/1992

(Continued)

*Primary Examiner*—Andrea Wellington
*Assistant Examiner*—Jorge L. Ortiz-Criado
(74) *Attorney, Agent, or Firm*—Wenderoth, Lind & Ponack, L.L.P.

(57) ABSTRACT

An optical recording medium of the present invention includes a substrate (202), a protection plate (205), and a plurality of information layers (203) sandwiched between the substrate and the protection plate. An information signal is recorded as a length of a mark and a length of a space between two marks. The mark is formed when the information layer is irradiated by light received through the substrate. The information layers have a management region (206) recording a leading edge recording condition and a trailing edge recording condition. The leading edge recording condition is used to change a recording start position for forming a leading edge of the mark. The trailing edge recording condition is used to change a recording end position for forming a trailing edge of the mark. Each of the leading and trailing edge recording condition is depending on which information layer is recorded.

19 Claims, 11 Drawing Sheets

U.S. PATENT DOCUMENTS

| | | |
|---|---|---|
| 6,791,926 B1 | 9/2004 | Furumiya et al. |
| 2004/0017752 A1 | 1/2004 | Furumiya et al. |
| 2004/0022151 A1 | 2/2004 | Furumiya et al. |

FOREIGN PATENT DOCUMENTS

| | | | |
|---|---|---|---|
| EP | 0 797 193 | | 9/1997 |
| EP | 984441 | | 3/2000 |
| EP | 1 059 630 | | 12/2000 |
| JP | 2679596 | | 8/1997 |
| JP | 11-3550 | | 1/1999 |
| JP | 11066576 | * | 3/1999 |
| JP | 2000-293947 | | 10/2000 |
| WO | 96/19807 | | 6/1996 |
| WO | 97/14143 | | 4/1997 |
| WO | 00/28535 | | 5/2000 |

* cited by examiner

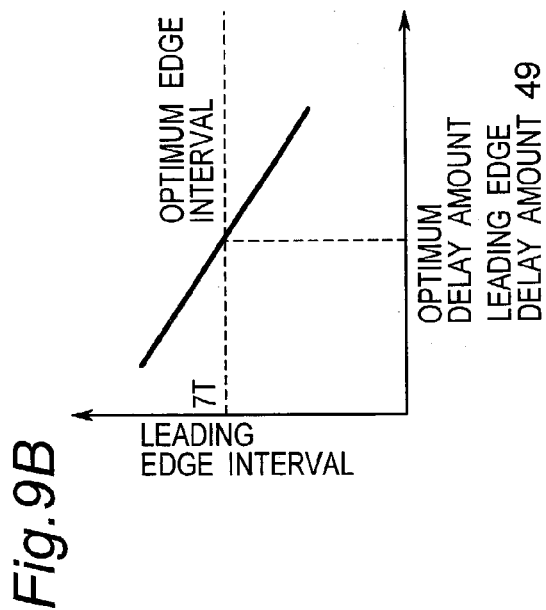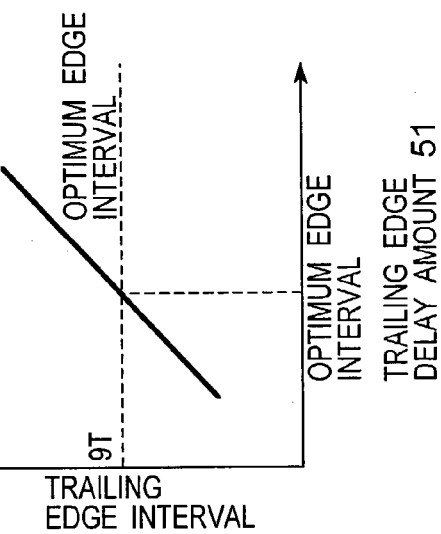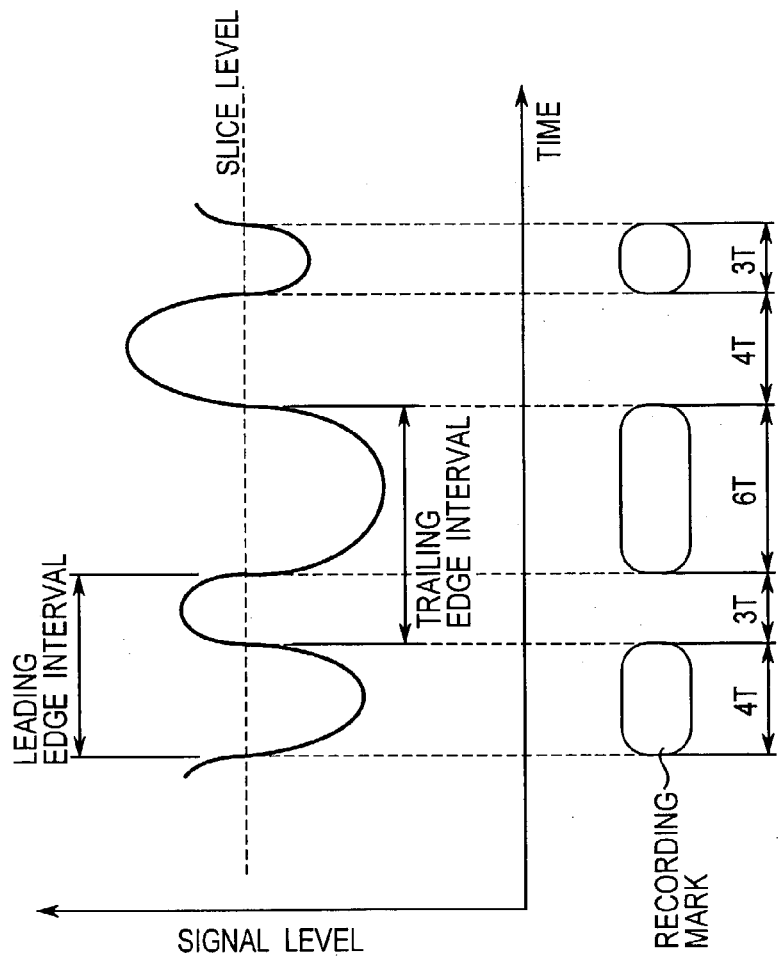
Fig.9B
Fig.9C
Fig.9A

OPTICAL RECORDING MEDIUM, METHOD FOR RECORDING ON OPTICAL RECORD MEDIUM, AND APPARATUS FOR RECORDING ON OPTICAL RECORD MEDIUM

BACKGROUND OF THE INVENTION

1. Technical Field

The present invention relates to an optical recording medium and a recording and reproducing apparatus capable of recording or reproducing signals of high density by irradiating a plurality of thin recording films formed on a substrate with a high energy beam such as laser beam.

2. Background Art

Recently, commercialization of optical recording media capable of recording, erasing and reproducing information, and research and development of rewritable optical recording medium of high density capable of recording moving images of high quality are actively done. Known examples of rewritable optical recording media include the phase change optical recording medium having a disk-shaped substrate and an overlaying information layer such as a thin chalcogenide film using Te or Se as the base such as Ge—Sb—Te or In—Se, or a semimetallic thin film such as In—Sb. A magneto-optical recording medium having a thin metal film of Fe—Tb—Co or the like as an information layer is also known. Further, a write-once optical recording medium using a dye material is also known.

In the phase change optical recording medium, for example, an information layer composed of the phase change material is momentarily irradiated with a laser beam focused in a light spot of a sub-micron order size, and the irradiated area is locally heated up to a specified temperature. When heated over a crystallization temperature, the irradiated area is transited from amorphous state to crystalline state, and when further heated over a melting point to be fused and then quenched, it is transited to amorphous state. Either the amorphous state or the crystalline state is defined as recorded state or erased state (unrecorded state), and by forming in a pattern corresponding to the information signal, reversible information recording or erasing may be realized. The optical characteristic of crystalline state is different from the optical characteristic of amorphous state, and by making use of this difference, the signal can be reproduced by detecting optically as a reflectivity change or a transmissivity change.

In a magneto-optical recording medium, for example, a magneto-optical recording thin film is irradiated with a focused laser beam, and is locally heated to a specified temperature. By applying a magnetic field simultaneously when heating, the direction of magnetization of the magneto-optical recording thin film is reversed depending on the information, so that the information can be recorded or erased.

As a high density data recording method on an optical recording medium, mark length recording is known. In mark length recording, various mark lengths are recorded between various space lengths, and recorded information is assigned in both mark length and space length. In other proposed optical recording medium, in order to increase the capacity of the optical recording medium outstandingly, a plurality of information layers are provided, and a laser beam is irradiated from one side, and information is recorded or rewritten in each information layer.

When recorded in a phase change recording medium by the mark length recording method, the amorphous region is defined as a mark, and the crystalline region as a space. In order to record at higher density in this recording medium, the length of the marks and spaces to be recorded must be shortened. However, when the space length is shorter, the heat at the trailing edge of the recorded mark has an effect on temperature rise at the leading edge of the mark to be recorded next, or the heat at the leading edge of the mark recorded next has an effect on the cooling process of the preceding mark, that is, so-called heat interference occurs. By this heat interference, the edge position of the leading edge or trailing edge of the recording mark is deviated from the proper position, and the bit error rate is deteriorated on reproduction.

To solve this problem, for example, it has been proposed to prevent the mark edge position from varying due to heat interference due to recording by varying the leading edge position and trailing edge position of recorded pulse so that the space length space recording may be a specified length, when the space is shorter than the specified length on detecting the length of space between marks (Japanese Patent No. 2,679,596, corresponding U.S. Pat. No. 5,490,126).

However, when a plurality of information layers are provided, each information layer must be irradiated with a proper quantity of laser beam. For example, as shown in FIG. 11, in an optical recording medium having two information layers, that is, a first information layer 904 and a second information layer 908, it must be designed so that a laser beam 901 may be irradiated to the second information layer which is at the remoter side from the irradiation direction of the laser beam 901, and may be returned to the incident side to reproduce the information. Accordingly, the transmissivity of the laser beam 901 passing through a protection layer 903, the first information layer 904 and a protection layer 905 at the side closer to the incident side of the laser beam 901 is generally designed to be higher than about 50%. To obtain such transmissivity higher than 50%, the protection layer 903 and protection layer 905 which are thin film adjacent to the first information layer 904 are made of nonmetallic transparent layers. In order that the second information layer 908 positioned at the remoter side from the incident side of the laser beam 901 may have a greater quantity of reflected light, generally, a reflection layer 910 made of a metal material is disposed adjacently to the second information layer 908.

In such configuration, depending on whether there is a thin metal film adjacently to the information layer or not, a difference is made in the heating and cooling condition of the information layer. That is, if each layer is irradiated with a laser beam of same pulse condition, different recording marks are provided in layers, and if the recording mark edge is moved (edge shift) and information is reproduced between layers, jitter of reproduced signal increases in either information layer, thereby increasing the error rate.

SUMMARY OF THE INVENTION

It is hence an object of the present invention, relating to an optical recording medium having a plurality of information layers, to present an optical recording medium and an optical recording and reproducing apparatus capable of forming recording marks of a small edge shift in any one of the information layers.

In accordance with one aspect of the present invention, there is an optical recording medium includes a substrate, a protection plate, and a plurality of information layers sandwiched between the substrate and the protection plate. The plurality of information layers are for recording information signals as a length of mark and a length of a space between two marks. The mark is formed when irradiated by light received through the substrate. The plurality of information layers have a management region recording a leading edge recording condition and a trailing edge recording condition. The leading edge recording condition is used to change a start position for forming a leading edge of the mark, the leading edge recording condition is depending on which information layer is recorded. The trailing edge recording condition is used to change a recording end position for forming a trailing edge of the mark, the trailing edge recording condition is depending on which information layer is recorded.

Preferably, the leading edge recording condition may include a condition depending on the length of the mark and the length of the space preceding the mark, and the trailing edge recording condition may include a condition depending on the length of the mark and the length of the space succeeding the mark.

Preferably, the leading edge recording condition and the trailing edge recording condition may include a condition of whether data have been recorded or not in one of the information layers positioned at light incident side.

Preferably, the management region may be provided in one of the plurality of information layers.

Preferably, the management region may be provided in one of the information layers at light incident side.

Preferably, each of the plurality of information layers has a identifier for information layer.

Preferably, each of the plurality of information layers may have a recording identifier on whether data have been recorded or not therein. These recording identifier may be recorded in the management region.

In another aspect of the present invention, the optical recording medium includes a substrate, a protection plate, and a plurality of information layers sandwiched between the substrate and the protection plate. The plurality of information layers are for recording information signals as a length of a mark and a length of a space between two marks. The mark is formed when irradiated by light received through the substrate. The plurality of information layers have a learning region provided for leading edge position learning for determining an optimum value of recording start position used for forming the leading edge of the mark, and trailing edge position learning for determining an optimum value of the recording end position for forming the trailing edge of the mark to be recorded.

Preferably, each of the plurality of information layers may have the learning region.

Preferably, the optimum value of the recording start position and that of the recording end position may include an information on information layer to be recorded, the length of mark, and the length of the space preceding and succeeding the marks.

Preferably, the plurality of information layers may have a recording region for recording the optimum values of the recording start position and recording end position obtained by the learning.

Preferably, it may further include another learning region for learning the leading edge position and the trailing edge position when the information layer at light incident side of the information layer to be recorded includes recorded data and when it does not include recorded data.

In a further aspect of the present invention, a recording method of optical recording medium for recording information signals in an information layer as a length of mark and a length of a space between two marks. The mark is formed when irradiated by light received trough the information layer. The recording method includes setting a leading edge starting condition, setting a trailing edge starting condition, and recording information signals by forming marks when irradiated by light received through the information layer. The leading edge starting condition may be used to change a recording start position for forming a leading edge of the mark depending on the length of the mark, the length of the space preceding the mark, and the information layer to be recorded. The trailing edge starting condition may be used to change the recording end position for forming a trailing edge of the mark depending on the length of the mark, the length of the space succeeding the mark, and the information layer to be recorded. The information signal is recorded by forming marks when irradiated by light received through the information layer. This recording is performed after setting a leading edge starting condition and setting a trailing edge starting condition.

Preferably, the recording start and end positions may be changed for recording depending on a recorded or unrecorded state of the upper information layer positioned at light incident side.

Preferably, if recorded state and unrecorded state coexist in the upper information layer, the recording start position may be set as a position between the recording start positions in unrecorded state and in recorded state, and the recording end position may be set as a position between the recording end positions in unrecorded state and in recorded state.

Preferably, the recording start position and recording end position may be corrected based on quantity of light reflected from the upper information layer positioned at light incident side of the information layer to be recorded.

In a still further aspect of the present invention, there is a recording method of optical recording medium for recording information signals as a length of a mark and a length of a space between two marks. The mark is formed when irradiated by light received. The recording method includes, prior to recording the information, learning a leading edge for determining an optimum value of recording start position for forming the leading edge of the mark, and a step of learning a trailing edge for determining an optimum value of recording end position for forming the trailing edge of the mark. Learning the leading edge for determining an optimum value of recording start position is performed by trial writing of the marks by changing the information layer to be recorded, the length of the mark, and the length of the space preceding the mark. Learning the trailing edge for determining an optimum value of recording end position is performed by trial writing of the marks by changing the information layer to be recorded, the length of the mark, and the length of the space succeeding the mark.

Preferably, it may further includes selecting at least two information layer out of the plurality of information layers, executing leading edge learning and trailing edge learning, and calculating optimum values of the recording start position and the recording end position of information layer other than the information layers, on the basis of the learning results at the leading edge learning and trailing edge learning.

Preferably, the optimum value of the recording start position and the recording end positions obtained as a result of learning at the leading edge learning step and trailing edge learning step may be recorded in the plurality of information layers.

Preferably, the optimum value of the recording start position and the optimum value of the recording end position obtained as a result of learning at the leading edge learning step and trailing edge learning step may be recorded in a storage device provided in a recording apparatus for the optical recording medium.

Preferably, an information about the leading edge recording condition and the information about the trailing edge recording condition recorded in the management region may be used as initial values at the leading edge learning and at the trailing edge learning.

Preferably, the leading edge learning and trailing edge learning may be executed when detecting a change in recorded state of the upper information layer positioned at light incident side of the information layer to be recorded.

Preferably, the leading edge learning and trailing edge learning may be executed when detecting a change in the quantity of light reflected from the information layer to be recorded.

In a yet further aspect of the present invention, there is a recording apparatus of optical recording medium having a plurality of information layers for recording information signals as a length of a mark and a length of a space between two marks. The mark is formed when irradiated by light received through the information layer. The recording apparatus includes a layer detector circuit, a basic pulse generator, a data length detector, a pulse synthesizer, and a laser driver. The layer detector circuit detects which one of the plurality of information layers is an information layer to be recorded. The basic pulse generator generates a pulse of a predetermined width at a leading edge position of a mark to be formed, pulse at the middle of the mark, and pulse of a predetermined width at a trailing edge position of the mark. The data length detector is composed of a recording mark detector circuit detecting the length of the mark, a preceding space detector circuit detecting the length of a space preceding the mark, a succeeding mark detector circuit detecting the length of a mark succeeding the mark, and a succeeding space detector circuit detecting the length of a space succeeding the mark. The timing controller is composed of a leading edge pulse delay circuit generating a delayed leading edge pulse by setting the delay amount of the leading edge pulse from the output signals of the recording mark detector circuit, preceding space detector circuit and layer detector circuit, and a trailing edge pulse delay circuit generating a delayed trailing edge pulse by setting the delay amount of the trailing edge pulse from the output signals of the recording mark detector circuit, succeeding space detector circuit and layer detector circuit. The pulse synthesizer forms a recording pulse by synthesizing the delayed leading edge pulse signal, intermediate pulse signal, and delayed trailing edge pulse signal. The laser driver modulates the intensity of the beam on the basis of the recording pulse.

Preferably, it may further include a timing controller composed of a recording identifying circuit, a leading edge pulse delay circuit, and a trailing edge pulse delay circuit. The recording identifying circuit detects the recorded state of the upper information layer positioned at light incident side of the information layer to be recorded. The leading edge pulse delay circuit generates a delayed leading edge pulse by setting the delay amount of the leading edge pulse from the output signals of the recording mark detector circuit, the preceding space detector circuit, said layer detector circuit, and the recording identifying circuit. The trailing edge pulse delay circuit generates a delayed trailing edge pulse by setting the delay amount of the trailing edge pulse from the output signals of the recording mark detector circuit, the succeeding space detector circuit, the layer detector circuit, and the recording identifying circuit.

Preferably, it may further include selector selecting the delay amount of leading edge pulse and delay amount of trailing edge pulse, from the leading edge starting information and trailing edge starting information recorded in the management region, according to the identifying result of the layer detector circuit.

Preferably, it may further include selector selecting the delay amount of leading edge pulse and delay amount of trailing edge pulse, from the leading edge starting information and trailing edge starting information recorded in the management region, according to the identifying result of the recording identifying circuit.

Preferably, it may further include a detector detecting the quantity of reflected light of the information layer to be recorded. Then, the delay amount of leading edge pulse and delay amount of trailing edge pulse may be determined based on the detecting result obtained by the reflected light quantity detector.

Preferably, the layer detector circuit may detect the layer identifier for identifying the information layer.

Preferably, the recording identifying circuit may detect the recording identifier for distinguishing whether the information layer is in recorded state or in unrecorded state.

In a yet aspect of the present invention, there is a recording apparatus of optical recording medium having a plurality of information layers for recording information signals as a length of a mark and a length of a space between two marks. The mark is formed when irradiated by light received through the information layer. The recording apparatus includes a layer detector, a leading edge learning means, and a trailing edge learning means. The layer detector detects which one of the plurality of information layers is the information layer to be recorded. The leading edge learning means determines an optimum value of delay amount of leading edge pulse depending on a position of the information layer to be recorded, a length of a mark, and a length of a space preceding the mark. The trailing edge learning means determines an optimum value of delay amount of trailing edge pulse depending on the position of the information layer to be recorded, a length of the mark, and the length of a space succeeding a recording mark.

Preferably, it may further include operating means for operating the leading edge learning means and trailing edge learning means by selecting at least two information layers out of the plurality of information layers, and calculating the optimum value of recording start position and the optimum value of recording end position of other information layers from the operating results of the leading edge learning means and trailing edge learning means.

Preferably, it may further include learning result recording device recording the learning result information obtained from the leading edge learning means and trailing edge learning means on the optical recording medium.

Preferably, the leading edge learning means and trailing edge learning means may use the leading edge recording information and trailing edge recording information recorded in the management region as initial values.

Preferably, the leading edge learning means and trailing edge learning means may further calculate when detecting a change in the recorded or unrecorded state of each information layer.

Preferably, the leading edge learning means and trailing edge learning means may further calculate when detecting a change in the quantity of reflected light in the information layer to be recorded.

According to the present invention, in the optical recording medium having a plurality of information layers, in the case of mark length recording at high density, an independent recording condition can be set in each recording layer. Therefore, in all information layers, jitter of signals when recording marks are reproduced can be decreased, then the bit error rate of signals can be improved. As a result, the data recording density is notably improved, then the optical recording medium can be increased in capacity.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 9 is a conceptual diagram showing the relation of reproduced signal of recording mark, delay amount, and edge interval in the third embodiment of the present invention;

BEST MODE FOR CARRYING OUT THE INVENTION

Figure 1:
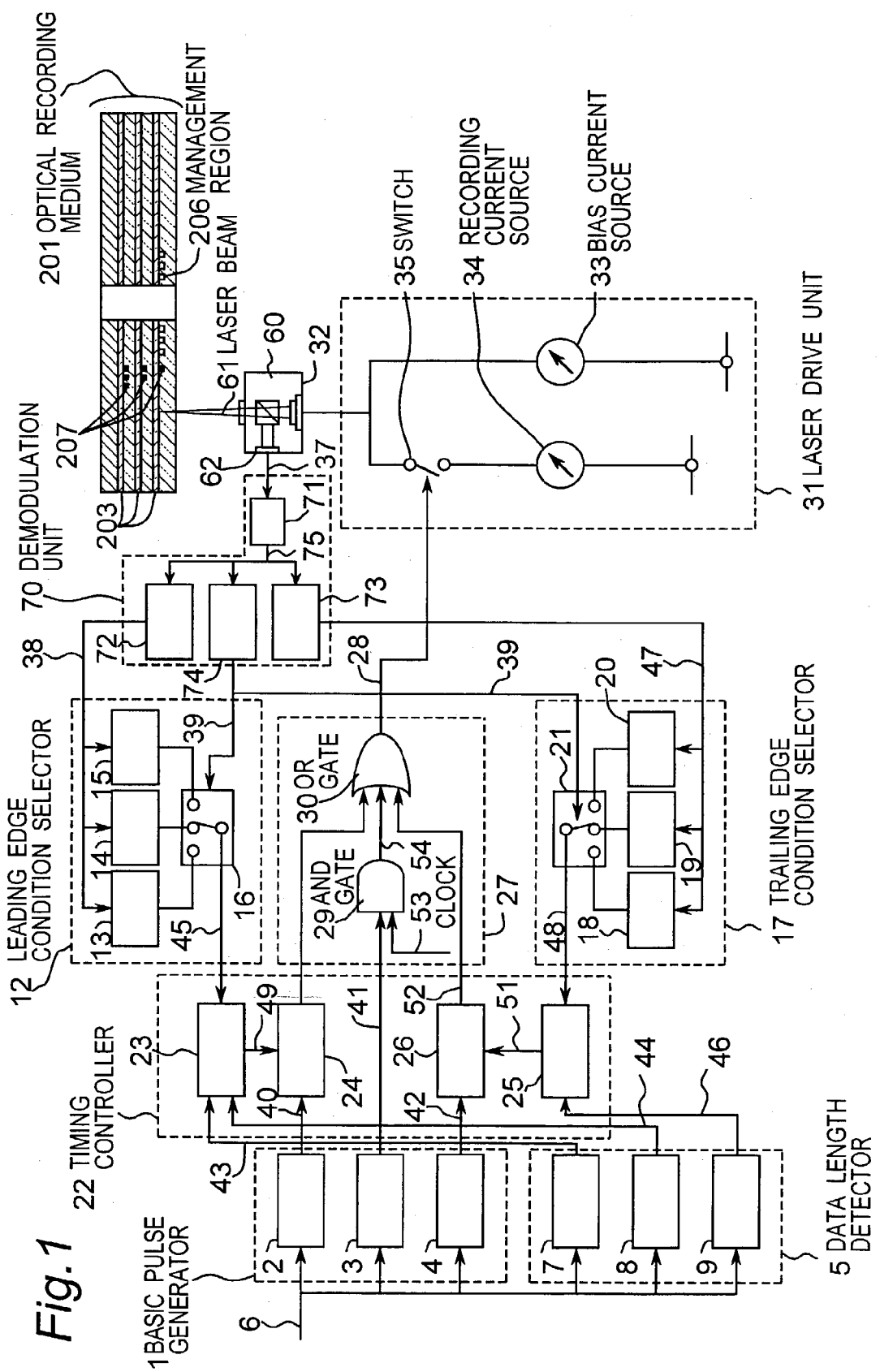
FIG. 1 is a block diagram showing a recording apparatus of optical recording medium in a first embodiment of the present invention.

Referring now to the drawings, embodiments of the invention are described below.

Embodiment 1

Figure 2:
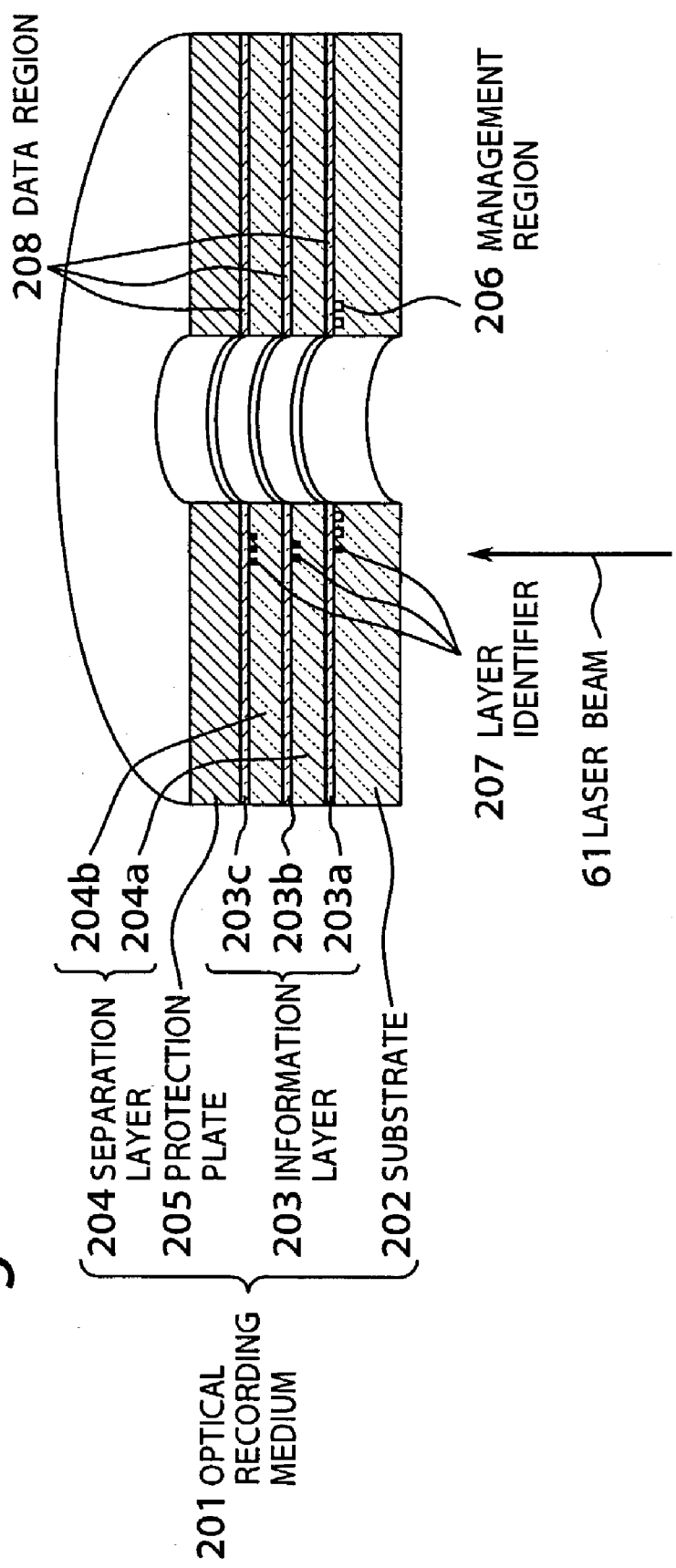
FIG. 2 is a sectional view of optical recording medium in the first embodiment of the present invention.

FIG. 2 is a sectional view showing an optical recording medium used in a first embodiment of the present invention. In FIG. 2 an optical recording medium 201 includes a plurality of information layers 203 (203a, 203b, 203c) formed on a substrate 202, and the individual information layers are separated by separation layers 204 (204a, 204b). In this embodiment, the multilayer recording layer is composed of, for example, three information layers 203.

The substrate 202 is made of polycarbonate or other resin material, or glass. On the surface of the substrate, various patterns are formed, such as guide tracks having a specific depth for tracking of beam, pits for address, or pits depending on the management information of the optical recording medium.

The material for composing the information layers 203a, 203b, 203c is available in two types, that is, the write-once type for recording only once, and the rewritable type for recording repeatedly. The write-once type recording materials include a material making use of phase change, such as Te—O and Te—O—Pd, that is, the signal is recorded by making use of difference in optical constant between amorphous state and crystalline state. Other is a recording material for recording by making use of change in the quantity of reflected light or quantity of transmitted light depending on diffraction by shape change of organic dye material or the like, or presence or absence of information layer. The rewritable type materials include a phase change material changing in phase between amorphous and crystalline state, and magneto-optical material making use of magneto-optical effect. As phase change material, such as Ge—Sb—Te or In—Sb—Te may be used. As magneto-optical material, for example, Tb—Fe—Co may be used.

Transparent separation layers 204a and 204b are formed among the information layers 203a, 203b, 203c. The separation layers 204a, 204b are required to be thin films small in light absorption at the wavelength of the irradiating light, and dielectric materials such as $SiO_2$, ZnS, SiN, and AlN, or PMMA, polystyrene, and other resin materials may be used. The interval of the information layers 203a, 203b, 203c is set according to the allowable crosstalk of signals recorded in each information layer. On the information layer 203c laminated at the remotest position as seen from the light incident side, a protection plate 205 is provided to protect the information layer. The material of the protection plate 205 may be same as the material of the substrate 202, or metal or other flat plate.

In a data region 208 for recording information signals on the information layer 203, marks of various lengths are recorded at intervals of various spaces by assigning recording information in both mark length and space length.

A management region 206 is provided in a specific position of the optical recording medium 201. The management region 206 records, in each one of the information layers 203a, 203b, 203c, a starting information about leading edge recording condition and a starting information about trailing edge recording condition. The starting information about leading edge for varying the recording start position for forming the leading edge of the mark to be recorded, and depends on the length of the mark to be recorded and the length of the space preceding the mark. Then, The starting information about trailing edge recording condition varies the recording end position for forming the trailing edge of the mark to be recorded, and depends on the length of the mark to be recorded and the length of the space succeeding the mark. The form of the management region 206 may be pits, same recording mark shape as data region, barcode, or combination thereof. As a result, recording conditions of each information layer can be set depending on characteristics of information layer, and a stable recorded state can be obtained.

The management region 206 is provided on one specific information layer, preferably on the information layer 203a at the closest side to the light source from the light incident side. The light beam may be directed to the information layer 203a to reproduce the information recorded in the management region 206 of the information layer 203a without passing through other layers. Therefore, the information may be clearly reproduced.

Further on the information layers 203a, 203b, 203c, layer identifiers 207 recording the information for identifying the lamination position of each information layer provided at positions close to the data region 208 on the same layer. The form of the layer identifiers 207 may be pits, same recording mark shape as data region, barcode, or combination thereof. The layer identifiers 207 may also have an information of the address for managing the position information in the plane direction. In this case, the information layer to be recorded and the information of the radial position can be identified by the layer identifiers 207 at the same time.

Figure 3:
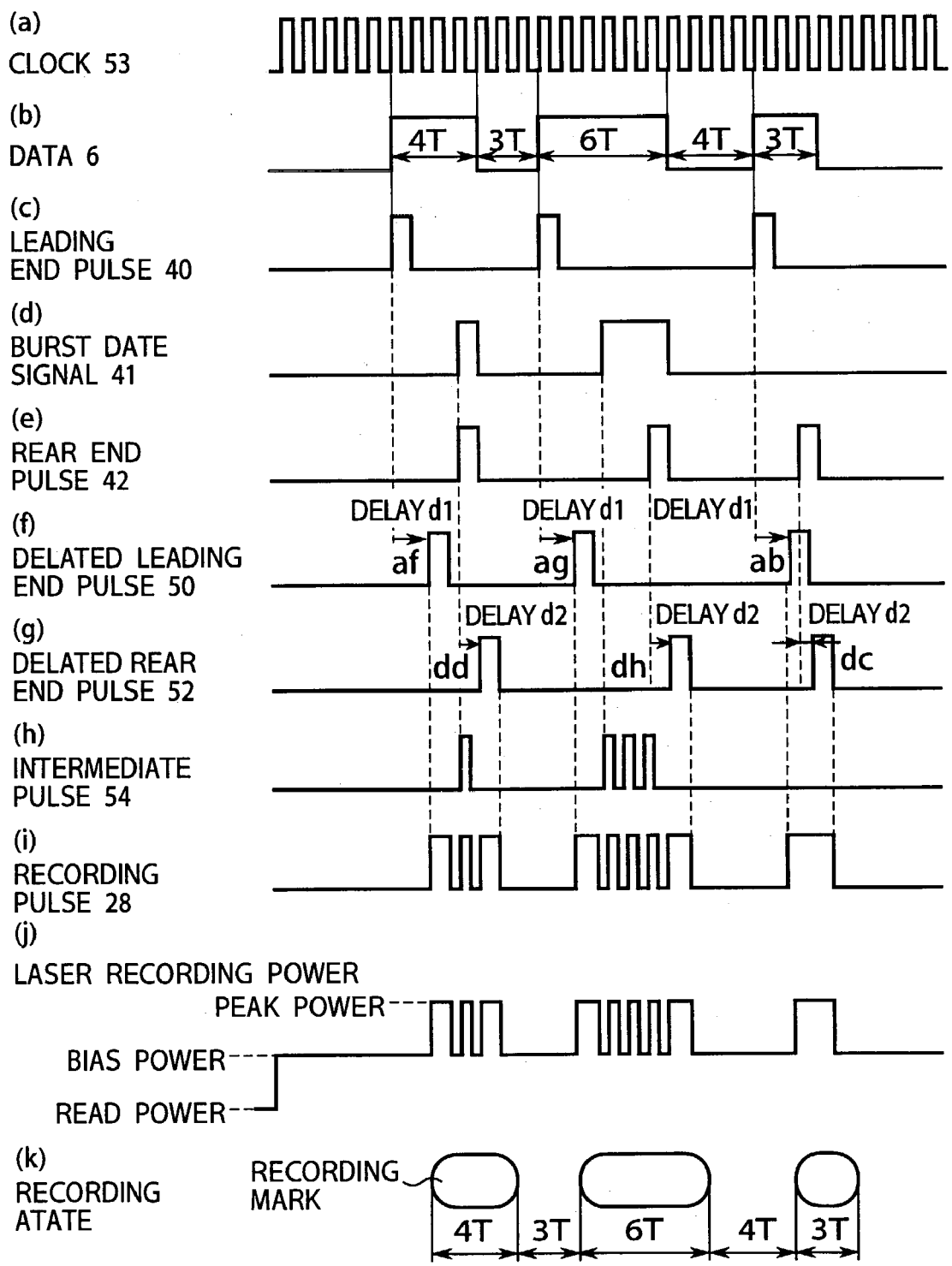
FIG. 3 is a timing chart when forming recording marks on optical recording medium in the first embodiment of the present invention.

Referring to a block diagram in FIG. 1 and a timing chart in FIG. 3, it is explained how an apparatus records an information in the optical recording medium 201 from an external apparatus. The data 6 (FIG. 3(b)) is the information to be recorded at the timing synchronized with clock 53 (FIG. 3(a)). The data 6 is fed in a leading edge pulse generating circuit 2, a burst gate generating circuit 3, and a trailing edge pulse generating circuit 4, which are combined to compose a basic pulse generator 1. In the leading edge pulse generator circuit 2, a leading edge pulse 40 (FIG. 3(c)) having one period width of clock is generated in the leading edge of Hi period of data 6 (FIG. 3(b)). In the burst gate generator circuit 3, a bust gate signal 41 (FIG. 3(d)) is generated in a length shorter by three clocks than the clock length of the mark to be recorded in the middle position of the mark. However, if the mark length is three clocks or shorter, burst gate signal 41 is not generated. In the trailing edge pulse generating circuit 4, a trailing edge pulse 42 (FIG. 3(e)) having one period of clock is generated in the trailing edge of Hi period of data 6.

In the embodiment, the input data 6 (FIG. 3(b)) is data in a length of clock unit, and signals like (8–16) modulation signal having Hi period or Lo period having three periods or longer of the clock 53 (FIG. 3(a)). Then, the data having the Hi period is recorded as a mark on the optical recording medium, and the data having the Lo period is recorded as a space between two marks. That is to say, mark and space length recording. To simplify the explanation, it is supposed to change the leading edge recording condition and trailing edge recording condition by detecting space length and mark length of 3T and 4T, respectively.

The data 6 is further fed in a preceding space detector circuit 7, a recorded mark detector circuit 8, and a succeeding space detector circuit 9, which are combined to compose a data length detector 5. The preceding space detector circuit 7 detects data of three-clock and four-clock width of Lo period of data 6, that is, 3T and 4T spaces, and sends a space length detection signal 43 to a leading edge starting position setting circuit 23. The recorded mark detector circuit 8 sends a recorded mark length detection signal 44, by detecting the length of the recorded mark, to the leading edge starting position setting circuit 23.

A laser beam 61 is irradiated to the management region 206 on the optical recording medium 201 through an optical pick 60, and a reflected light from the management region 206 is received and converted into an electric signal by a detector 62. Then, a detection signal 37 is outputted from the detector 62. An amplifier 71 amplifies the detection signal 37, and outputs a reproduction signal 75 to a leading edge recording information demodulation circuit 72, a trailing edge recording information demodulation circuit 73, and a layer detector circuit 74.

The leading edge recording information demodulation circuit 72 demodulates the leading edge recording information 38 for recording in each information layer included in the reproduction signal 75. The leading edge recording information 38 is stored respectively in first to third leading edge condition memory circuits 13, 14, 15 corresponding to the information layers.

Table 1 is an examples of leading edge memory information of the leading edge condition memory circuits 13, 14, 15. The first leading edge condition memory circuit 13 stores leading edge starting position parameters (layer information, preceding space length, recording mark length) of the information layer 203a, and leading edge starting position setting (address (setting value), delay time d1) corresponding to the parameters. Similarly, the second and third leading edge condition memory circuits 14, 15 store the leading edge starting position parameters of each layer and leading edge starting position setting corresponding to the parameter. In this way, the leading edge recording condition is stored in each leading edge condition memory circuit for each information layer.

TABLE 1

Composition of leading edge Recording information

| Circuit Name | Leading edge starting parameter | | | Leading edge starting position condition | |
|---|---|---|---|---|---|
| | Information layer | Preceding space length | Mark length | Address | Delay time d1 (ns) |
| First leading edge condition memory circuit 13 | Information layer 203a | 3 T | 3 T | 11 | aa |
| | | 4 T | 3 T | 12 | ab |
| | | 5 T to 11 T | 3 T | 13 | ac |
| | | 3 T | 4 T | 14 | ad |
| | | 4 T | 4 T | 15 | ae |
| | | 5 T to 11 T | 4 T | 16 | af |
| | | 3 T | 5 T to 11 T | 17 | ag |
| | | 4 T | 5 T to 11 T | 18 | ah |
| | | 5 T to 11 T | 5 T to 11 T | 19 | ai |
| Second leading edge condition memory circuit 14 | Information layer 203b | 3 T | 3 T | 21 | ba |
| | | 4 T | 3 T | 22 | bb |
| | | 5 T to 11 T | 3 T | 23 | bc |
| | | 3 T | 4 T | 24 | bd |
| | | 4 T | 4 T | 25 | be |
| | | 5 T to 11 T | 4 T | 26 | bf |
| | | 3 T | 5 T to 11 T | 27 | bg |
| | | 4 T | 5 T to 11 T | 28 | bh |
| | | 5 T to 11 T | 5 T to 11 T | 29 | bi |
| Third leading edge condition memory circuit 15 | Information layer 203c | 3 T | 3 T | 31 | ca |
| | | 4 T | 3 T | 32 | cb |
| | | 5 T to 11 T | 3 T | 33 | cc |
| | | 3 T | 4 T | 34 | cd |
| | | 4 T | 4 T | 35 | ce |
| | | 5 T to 11 T | 4 T | 36 | cf |
| | | 3 T | 5 T to 11 T | 37 | cg |
| | | 4 T | 5 T to 11 T | 38 | ch |
| | | 5 T to 11 T | 5 T to 11 T | 39 | ci |

Similarly, the trailing edge recording information demodulation circuit 73 demodulates the trailing edge recording information 47 for recording in each information layer included in the reproduction signal 75. The trailing edge recording information 47 is stored respectively in first to third trailing edge condition memory circuits 18, 19, 20 corresponding to the information layers.

Table 2 shows an examples of trailing edge memory information of the trailing edge condition memory circuits 18, 19, 20. The first trailing edge condition memory circuit 18 stores trailing edge starting position parameters (layer information, succeeding space length, recording mark length) of the information layer 203a, and trailing edge starting position setting (address (setting value), delay time d2) corresponding to the parameters. Similarly, the second and third trailing edge condition memory circuits 19, 20 store the trailing edge starting position parameters of each layer and trailing edge starting position setting corresponding to the parameters. In this way, the trailing edge recording condition is stored in each trailing edge condition memory circuit for each information layer.

TABLE 2

Composition of trailing edge recording information

| Circuit Name | Information layer | Trailing edge starting position | | Trailing edge starting position condition | |
|---|---|---|---|---|---|
| | | parameter | | | Delay |
| | | Mark length | Succeeding space length | Address | time d2 (ns) |
| First trailing edge condition memory circuit 18 | Information layer 203a | 3 T | 3 T | 41 | da |
| | | 3 T | 4 T | 42 | db |
| | | 3 T | 5 T to 11 T | 43 | dc |
| | | 4 T | 3 T | 44 | dd |
| | | 4 T | 4 T | 45 | de |
| | | 4 T | 5 T to 11 T | 46 | df |
| | | 5 T to 11 T | 3 T | 47 | dg |
| | | 5 T to 11 T | 4 T | 48 | dh |
| | | 5 T to 11 T | 5 T to 11 T | 49 | di |
| Second trailing edge condition memory circuit 19 | Information layer 203b | 3 T | 3 T | 51 | ea |
| | | 3 T | 4 T | 52 | eb |
| | | 3 T | 5 T to 11 T | 53 | ec |
| | | 4 T | 3 T | 54 | ed |
| | | 4 T | 4 T | 55 | ee |
| | | 4 T | 5 T to 11 T | 56 | ef |
| | | 5 T to 11 T | 3 T | 57 | eg |
| | | 5 T to 11 T | 4 T | 58 | eh |
| | | 5 T to 11 T | 5 T to 11 T | 59 | ei |
| Third trailing edge condition memory circuit 20 | Information layer 203c | 3 T | 3 T | 61 | fa |
| | | 3 T | 4 T | 62 | fb |
| | | 3 T | 5 T to 11 T | 63 | fc |
| | | 4 T | 3 T | 64 | fd |
| | | 4 T | 4 T | 65 | fe |
| | | 4 T | 5 T to 11 T | 66 | ff |
| | | 5 T to 11 T | 3 T | 67 | fg |
| | | 5 T to 11 T | 4 T | 68 | fh |
| | | 5 T to 11 T | 5 T to 11 T | 69 | fi |

Consequently, by irradiated the laser beam 61 to the layer identifier 207 provided on each information layer 203, a desired information layer is identified.

The layer detector circuit 74 demodulates the information layer identifying information of the layer identifier 207 from the reproduction signal 75, and identifies which the information layer focused by the laser beam 61 is any one of 203a, 203b, 203c, and outputs an identifying signal 39 for information layer. According to the identifying signal 39 for information layer, a leading edge condition changeover switch 16 selects one leading edge condition memory circuit (13, 14, 15) corresponding to the information layer to be recorded, and outputs the stored leading edge recording information 45.

The leading edge starting position setting circuit 23 determines the parameter, on the basis of the preceding space length detection signal 43 and recording mark length detection signal 44, with respect to the leading edge recording information 45, and determines the delay time of the leading edge pulse from this parameter. For example, as explained in Table 1, when recording in the information layer 203a, the first leading edge condition memory circuit 13 is selected, and the contents of the addresses (setting values) 11 to 19 are determined, that is, the values of aa to ai as delay time d1 depending on the preceding space length and recording mark length. When recording in the information layer 203b, the second leading edge condition memory circuit 14 is selected, and the contents of the addresses (setting values) 21 to 29 are determined, that is, the values of ba to bi as delay time d1 depending on the preceding space length and recording mark length. Further, when recording in the information layer 203c, the third leading edge condition memory circuit 15 is selected, and the contents of the addresses (setting values) 31 to 39 are determined, that is, the values of ca to ci as delay time d1 depending on the preceding space length and recording mark length. Herein, the delay time d1 is supposed to be a positive value, but a negative value may be also included.

The leading edge pulse delay circuit 24 delays the leading edge pulse 40 (FIG. 3(c)) according to a delay signal 49 outputted from the leading edge position setting circuit 23, and outputs a delayed leading edge pulse 50 (FIG. 3(f)). Thus, depending on the information layer for forming recording marks, recording mark length, and preceding space length, the leading edge pulse delay circuit 24 may vary the delayed leading edge pulse 50 in the delayed amount.

Similarly, the trailing edge starting position setting circuit 25 determines the parameter, on the basis of the trailing edge recording information 48, recording mark length detection signal 44, and succeeding space length detection signal 46, and determines the delay time of the trailing edge pulse from this parameter. For example, as explained in Table 2, when recording in the information layer 203a, the first trailing edge condition memory circuit 18 is selected, and the contents of the addresses (setting values) 11 to 19 are determined, that is, the values of da to di as delay time d2 depending on the succeeding space length and recording mark length. When recording in the information layer 203b, the second trailing edge condition memory circuit 19 is selected, and the contents of the addresses (setting values) 21 to 29 are determined, that is, the values of ea to ei as delay time d2 depending on the succeeding space length and recording mark length. Further, when recording in the information layer 203c, the third trailing edge condition memory circuit 20 is selected, and the contents of the addresses (setting values) 31 to 39 are determined, that is, the values of fa to fi as delay time d2 depending on the succeeding space length and recording mark length. Herein, the delay time d2 is supposed to be a positive value, but a negative value may be also included.

The trailing edge pulse delay circuit 26 delays the trailing edge pulse 42 (FIG. 3(e)) according to a delay signal 51 outputted from the trailing edge position setting circuit 25, and outputs a delayed trailing edge pulse 52 (FIG. 3(g)). Thus, depending on the information layer for forming recording marks, recording mark length, and succeeding space length, the trailing edge pulse delay circuit 26 may vary the delayed trailing edge pulse 52 in the delayed amount.

On the other hand, an AND gate 29 operates logical product AND between burst gate signal 41 (FIG. 3(d)) and clock 53 (FIG. 3(a)), and outputs an intermediate pulse 54 (FIG. 3(h)). However, if the mark length is 3T or shorter, burst gate is not generated.

Next, an OR gate 30 operates logical sum OR of delayed leading edge pulse 50, delayed trailing edge pulse 52, and intermediate pulse 54, and generates a recording pulse 28 (FIG. 3(i)).

A laser drive unit 31 drives a laser unit 32 according to the recording pulse 28. The laser unit 32 emits light with a bias power by a driving current by a bias current source 33. Parallel to this bias current source 33, a recording current source 34 is connected, and when the current of the recording current source 34 is turned on or off by a switch 35, the laser unit 32 is switched between the peak power and bias power. When the recording pulse 28 is entered by the switch 35, the light emission strength of the laser unit 32 is modulated between the peak power and bias power, and a luminance waveform (FIG. 3(j)) is outputted. When this modulated light is emitted to the information layer on the optical recording medium 201, mark and space (FIG. 3(k)) are formed.

In this operation, the optical recording apparatus of the embodiment can record the mark recording start position and recording end position as marks and spaces corresponding to desired data in each desired information layer. Accordingly, it can decrease mark distortion due to heat interference caused by heating, cooling condition, and enhancement of density differing in each information layer, and hence decrease the jitter of signal when reproducing the recording mark of each recording layer. As a result, in each information layer of the optical recording medium having a plurality of information layers, signals can be recorded at small bit error rate.

In the embodiment, the information layer to be recorded is identified by the information of the layer identifier 207, but the information layer may be also identified by the difference in the quantity of reflected light from each information layer. In this case, the layer detector circuit 74 can identify which information layer is to be recorded by the magnitude of the signal level of the detection signal 37, so that the structure of the layer detector circuit 74 may be simplified.

The information layer may be also identified by the address having the position information exposed to light. In this case, a uniform address is set in all plurality of information layers. For example, a different address may be set in each information layer in the sector address provided in each sector in the information layer. In the demodulated address information, parallelising between the address and information layer, the information layer as reproducing can be specified.

In the embodiment, to simplify the explanation, three information layers 203 are laminated, but when the number of layers is increased or decreased, the addresses (setting values) may be set corresponding to the number of layers.

In this example, when the length of space is 5T or longer, the delay amount of the space is set to the specific value. If a space having a length longer than 5T will be used, any delay of leading edge pulse and trailing edge pulse for all space lengths are controlled so that the bit error rate will be improved.

By detecting the length of recorded mark and the length of space preceded the mark, the delay is controlled according to the result of detection. Furthermore, detecting the preceding and succeeding mark lengths, the length of space preceding the preceding mark, and the length of space succeeding the succeeding mark, then the delay of leading edge pulse and trailing edge pulse may be controlled according to this detection result. Thus, by preliminarily detecting the preceding and succeeding mark lengths or preceding and succeeding space lengths in a wider range, the bit error rate may be further improved.

By delay control of the leading edge pulse position and trailing edge pulse position, the recording start position and recording end position of the recording marks are determined, but by fixing the succeeding edge position of the leading edge pulse and delaying the leading edge pulse start edge position, the start edge position of the trailing edge pulse may be fixed and the trailing edge pulse end edge position may be delayed and controlled.

Embodiment 2

A second embodiment of the present invention is explained below. When recording in second and subsequent information layers from the light source side, the transmissivity of the information layer varies depending on whether the information layer of the light source layer is in recorded state or unrecorded state. Accordingly, the intensity of the laser beam reaching these information layers varies, and the recording condition at the leading edge and trailing edge may be changed. By contrast, in this embodiment, the independent leading edge recording condition and trailing edge recording condition are set depending on the recorded state of each layer closer to the light source side than the information layer to be recorded.

Figure 5:
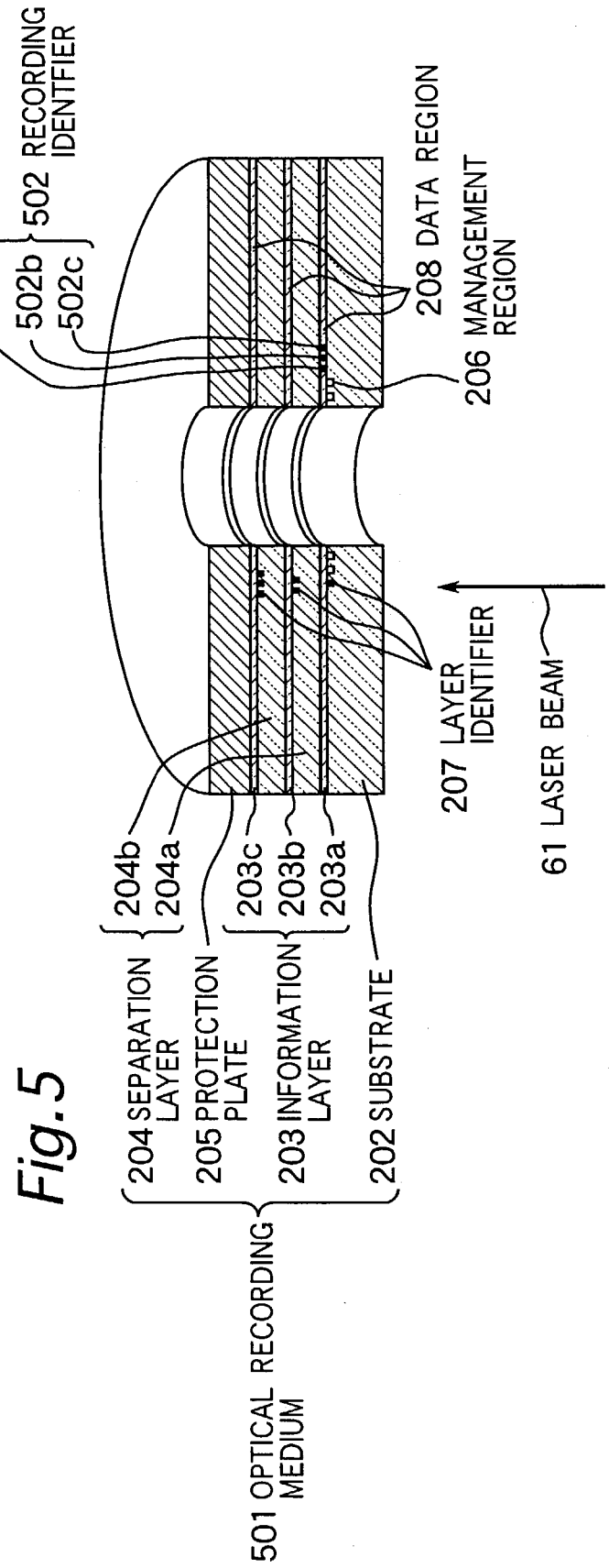
FIG. 5 is a sectional view of optical recording medium in the second embodiment of the present invention.

FIG. 5 is a sectional view of an optical recording medium. An optical recording medium 501 includes a substrate 202, an information layer 203, a separation layer 204, a protection plate 205, and a layer identifier 207, and the same one as in the first embodiment may be used. The information layer 203 includes recording identifiers 502 (502a, 502b, 502c) identifying whether the recorded state or unrecorded state of the information layers 203a, 203b, 203c. The form of the recording identifier 502 may be same recording mark shape as data region, barcode, or combination thereof.

The management region 206 includes, in addition to those in the first embodiment, the information of leading edge recording condition and trailing edge recording condition, depending on the recorded state of the information layer at light incident side of each information layer. That is, the information layer 203b has the information relating to two kinds of recording condition of the information layer 203a, and the information layer 203c has the information relating to four kinds of recording condition of the information layers 203a, 203b.

Figure 4:
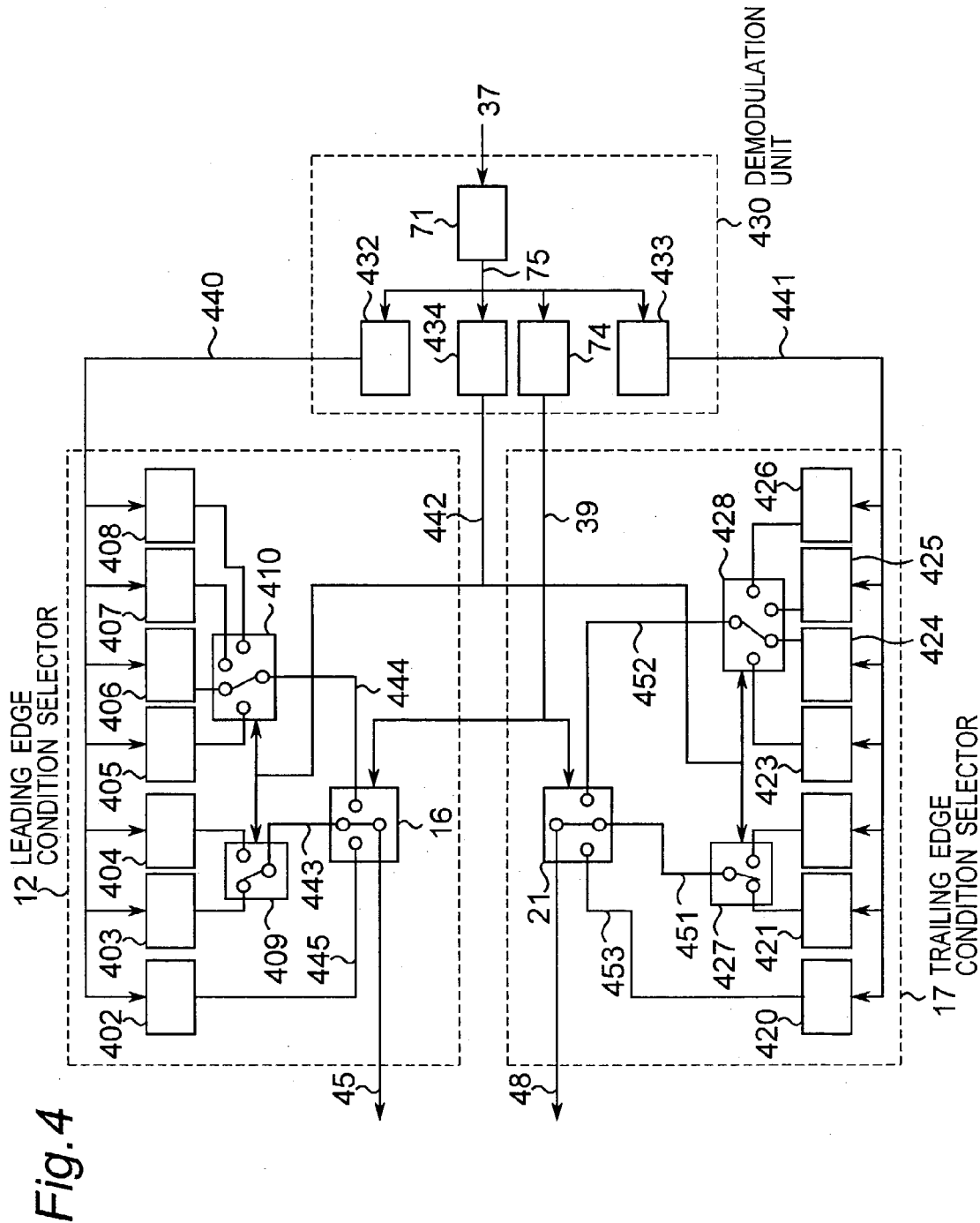
FIG. 4 is a block diagram showing a recording apparatus of optical recording medium in a second embodiment of the present invention.

Referring to a block diagram of FIG. 4, a configuration of an apparatus for recording information in the optical recording medium 501 is explained. FIG. 4 is similar to the block diagram of FIG. 1, except that the configuration of the leading edge condition selector, trailing edge condition selector, and demodulation unit is different.

A detection signal 37 from the optical recording medium 501 is amplified in an amplifier 71, and a reproduction signal 75 is outputted. A leading edge recording condition demodulation circuit 432 demodulates the leading edge recording information 440 contained in the reproduction signal 75. The leading edge recording information 440 is classified in seven types according to the information layer and recording condition. The leading edge recording information 440 having the seven types are respectively outputted in first leading edge condition memory circuit 402 to seventh leading edge condition memory circuit 408. Table 3 shows the contents recorded in the first leading edge condition memory circuit 402 to seventh leading edge condition memory circuit 408.

TABLE 3

Composition of leading edge recording signal

| Circuit name | Leading edge starting position parameter | | | | Leading edge starting position condition | |
|---|---|---|---|---|---|---|
| | Recorded state of Information layer | Recorded state of upper information layer | Preceding space length | Mark length | Address | Delay time d1 (ns) |
| First leading edge condition memory circuit 402 | Information layer 203a | — | 3 T | 3 T | 11 | aa |
| | | | 4 T | 3 T | 12 | ab |
| | | | 5 T to 11 T | 3 T | 13 | ac |
| | | | 3 T | 4 T | 14 | ad |
| | | | 4 T | 4 T | 15 | ae |
| | | | 5~11 T | 4 T | 16 | af |
| | | | 3 T | 5 to 11 T | 17 | ag |
| | | | 4 T | 5 to 11 T | 18 | ah |
| | | | 5~11 T | 5 to 11 T | 19 | ai |
| Second leading edge condition memory circuit 403 | Information layer 203b | Information layer 203a unrecorded | 3 T | 3 T | 21 | baa |
| | | | 4 T | 3 T | 22 | bba |
| | | | (omitted) | (omitted) | (omitted) | (omitted) |
| | | | 5~11 T | 5~11 T | 29 | bia |
| Third leading edge condition memory circuit 404 | Information layer 203b | Information layer 203a recorded | 3 T | 3 T | 21 | bab |
| | | | 4 T | 3 T | 22 | bbb |
| | | | (omitted) | (omitted) | (omitted) | (omitted) |
| | | | 5~11 T | 5~11 T | 29 | bib |
| Fourth leading edge condition memory circuit 405 | Information layer 203c | Information layers 203a, 203b unrecorded | 3 T | 3 T | 31 | caa |
| | | | 4 T | 3 T | 32 | cba |
| | | | (omitted) | (omitted) | (omitted) | (omitted) |
| | | | 5~11 T | 5~11 T | 39 | cia |
| Fifth leading edge condition memory circuit 406 | Information layer 203c | Information layers 203a, 203b recorded | 3 T | 3 T | 31 | cab |
| | | | 4 T | 3 T | 32 | cbb |
| | | | (omitted) | (omitted) | (omitted) | (omitted) |
| | | | 5~11 T | 5~11 T | 39 | cib |
| Sixth leading edge condition memory circuit 407 | Information layer 203c | Information layer 203a unrecorded, 203b recorded | 3 T | 3 T | 31 | cac |
| | | | 4 T | 3 T | 32 | cbc |
| | | | (omitted) | (omitted) | (omitted) | (omitted) |
| | | | 5~11 T | 5~11 T | 39 | cic |
| Seventh leading edge condition memory circuit 408 | Information layer 203c | Information layer 203a recorded, 203b unrecorded | 3 T | 3 T | 31 | cad |
| | | | 4 T | 3 T | 32 | cbd |
| | | | (omitted) | (omitted) | (omitted) | (omitted) |
| | | | 5~11 T | 5~11 T | 39 | cid |

The contents recorded in the first leading edge condition memory circuit 402 are the leading edge starting position setting (address (setting value), delay time d1) corresponding to the leading edge starting position parameters (layer information, preceding space length, recording mark length) when recording in the information layer 203a. The contents recorded in the second leading edge condition memory circuit 403 are the leading edge starting position setting (address (setting value), delay time d1) corresponding to the leading edge starting position parameters (layer information, preceding space length, recording mark length) when recording in the information layer 203b and when the incident side recording layer 203a is in unrecorded state. The contents recorded in the third leading edge condition memory circuit 404 are the leading edge starting position setting (address (setting value), delay time d1) corresponding to the leading edge starting position parameters (layer information, preceding space length, recording mark length) when recording in the information layer 203b and when the incident side recording layer 203a is in recorded state.

Further, the contents recorded in the fourth to seventh leading edge condition memory circuits 405, 406, 407, 408 are the leading edge starting position setting (address (setting value), delay time d1) corresponding to the leading edge starting position parameters (layer information, preceding space length, recording mark length) when recording in the information layer 203c and in four states, that is, when the two recording layers 203a, 203b positioned at light incident side are in recorded state and unrecorded state, respectively.

Next, by emitting light to the recording identifier 502 on the optical recording medium 501, the reproduction signal 75 is outputted to the recording identifying circuit 434. The recording identifying circuit 434 demodulates the recording identifying information from the reproduction signal 75, and identifies whether the information layers 203a, 203b are in recorded state or unrecorded state, and outputs a recording identifying signal 442. For example, when the information layer to be recorded is the information layer 203b, the second layer leading edge recording condition changeover switch 409 selects either the leading edge condition memory circuit 403 or 404 according to the recording identifying signal 442, and outputs leading edge recording information 443.

When the information layer to be recorded is the information layer 203c, the third layer leading edge recording condition changeover switch 410 selects any one of the leading edge condition memory circuits 405 to 408 according to the recording identifying signal 442, and outputs leading edge recording information 444. The leading edge condition changeover switch 16 operates same as in the first embodiment, and any one of the first layer leading edge information 445, second layer leading edge information 443, and third layer leading edge information 444 is selected according to the information layer identifying signal, and leading edge information 45 is outputted. By this operation, depending on the recorded state of the information layer to be recorded and each information layer at light incident side, a delayed leading edge pulse varied in the delay amount can be outputted.

Similarly, a trailing edge recording condition demodulation circuit 433 demodulates the trailing edge recording information 441 contained in the reproduction signal 75. The trailing edge recording information 441 are classified in seven types by the information layer and recording condition. The trailing edge recording information 441 are outputted in first trailing edge condition memory circuit 420 to seventh trailing edge condition memory circuit 426. Table 4 shows the contents recorded in the first trailing edge condition memory circuit 420 to seventh leading edge condition memory circuit 426.

TABLE 4

Composition of trailing edge recording signal

Trailing edge starting position parameter

| Circuit name | Recorded state of Information layer | upper information layer | Mark length | Succeeding space length | Address | Delay time d2 (ns) |
|---|---|---|---|---|---|---|
| First trailing edge condition memory circuit 420 | Information layer 203a | | 3 T | 3 T | 11 | da |
| | | | 3 T | 4 T | 12 | db |
| | | | 3 T | 5 T to 11 T | 13 | dc |
| | | | 4 T | 3 T | 14 | dd |
| | | | 4 T | 4 T | 15 | de |
| | | | 4 T | 5 to 11 T | 16 | df |
| | | | 5 T to 11 T | 3 T | 17 | dg |
| | | | 5 T to 11 T | 4 T | 18 | dh |
| | | | 5 T to 11 T | 5 T to 11 T | 19 | di |
| Second trailing edge condition memory circuit 421 | Information layer 203b | Information layer 203a unrecorded | 3 T | 3 T | 21 | eaa |
| | | | 4 T | 3 T | 22 | eba |
| | | | (omitted) | (omitted) | (omitted) | (omitted) |
| | | | 5 T to 11 T | 5 T to 11 T | 29 | eia |
| Third trailing edge condition memory circuit 422 | Information layer 203b | Information layer 203a recorded | 3 T | 3 T | 21 | eab |
| | | | 4 T | 3 T | 22 | ebb |
| | | | (omitted) | (omitted) | (omitted) | (omitted) |
| | | | 5 T to 11 T | 5 T to 11 T | 29 | eib |
| Fourth trailing edge condition memory circuit 423 | Information layer 203c | Information layers 203a, 203b unrecorded | 3 T | 3 T | 31 | faa |
| | | | 4 T | 3 T | 32 | fba |
| | | | (omitted) | (omitted) | (omitted) | (omitted) |
| | | | 5 T to 11 T | 5 T to 11 T | 39 | fia |
| Fifth trailing edge condition memory circuit 424 | Information layer 203c | Information layers 203a, 203b recorded | 3 T | 3 T | 31 | fab |
| | | | 4 T | 3 T | 32 | fbb |
| | | | (omitted) | (omitted) | (omitted) | (omitted) |
| | | | 5 T to 11 T | 5 T to 11 T | 39 | fib |
| Sixth trailing edge condition memory circuit 425 425 | Information layer 203c | Information layer 203a unrecorded 203b recorded 203b | 3 T | 3 T | 31 | fac |
| | | | 4 T | 3 T | 32 | fbc |
| | | | (omitted) | (omitted) | (omitted) | (omitted) |
| | | | 5 T to 11 T | 5 T to 11 T | 39 | fic |
| Seventh trailing edge condition memory circuit 426 | Information layer 203c | Information layer 203a recorded, 203b unrecorded | 3 T | 3 T | 31 | fad |
| | | | 4 T | 3 T | 32 | fbd |
| | | | (omitted) | (omitted) | (omitted) | (omitted) |
| | | | 5 T to 11 T | 5 T to 11 T | 39 | fid |

The contents recorded in the first trailing edge condition memory circuit 420 are the trailing edge starting position setting (address (setting value), delay time d2) corresponding to the trailing edge starting position parameters (layer information, succeeding space length, recording mark length) when recording in the information layer 203a. The contents recorded in the second trailing edge condition memory circuit 421 are the trailing edge starting position setting (address (setting value), delay time d2) corresponding to the trailing edge starting position parameters (layer information, succeeding space length, recording mark length) when recording in the information layer 203b and when the incident side recording layer 203a is in unrecorded state. The contents recorded in the third trailing edge condition memory circuit 422 are the trailing edge starting position setting (address (setting value), delay time d2) corresponding to the trailing edge starting position parameters (layer information, succeeding space length, recording mark length) when recording in the information layer 203b and when the incident side recording layer 203a is in recorded state.

Further, the contents recorded in the fourth to seventh trailing edge condition memory circuits 423, 424, 425 are the trailing edge starting position setting (address (setting value), delay time d2) corresponding to the trailing edge starting position parameters (layer information, succeeding space length, recording mark length) when recording in the information layer 203c and in four states, that is, when the two recording layers 203a, 203b positioned at light incident side are in recorded state and unrecorded state, respectively.

Next, by emitting light to the recording identifier 502 on the optical recording medium 501, the reproduction signal 75 is outputted to the recording identifying circuit 433. The recording identifying circuit 434 demodulates the recording identifying information from the reproduction signal 75, and identifies whether the information layers 203a, 203b are in recorded state or unrecorded state, and outputs a recording identifying signal 441. For example, when the information layer to be recorded is the information layer 203b, the second layer trailing edge recording condition changeover switch 427 selects either the trailing edge condition memory circuit 421 or 422 according to the recording identifying signal 441, and outputs trailing edge recording information 451.

When the information layer to be recorded is the information layer 203c, the third layer trailing edge recording condition changeover switch 428 selects any one of the trailing edge condition memory circuits 423 to 426 according to the recording identifying signal 441, and outputs trailing edge recording information 452. The trailing edge condition changeover switch 21 operates same as in the first embodiment, and any one of the first layer trailing edge information 453, second layer trailing edge information 451, and third layer trailing edge information 452 is selected according to the information layer identifying signal 39, and trailing edge information 48 is outputted. By this operation, depending on the recorded state of the information layer to be recorded and each information layer at light incident side, a delayed trailing edge pulse varied in the delay amount can be outputted.

By this operation, the optical recording medium of the embodiment can record the recording start position and recording end position of the mark depending on the information layer to be recorded, recorded state of the upper information layer at the incident side, recording mark length, and length of space preceding and succeeding the mark. Accordingly, it can compensate for the difference in the light irradiation condition caused by recorded state of the information layer at the incident side, and the jitter of the signal by reproducing the recording mark is decreased. As a result, signals of small bit error rate can be recorded in each information layer of the optical recording medium having a plurality of information layers.

The recording identifying circuit 434 may be also designed to output the recording identifying information according to the level of the quantity of reflected light from the information layer at the light source side by estimating the quantity of reflected light from the reproduction signal when reproducing the information layer to be recorded. If recorded region and unrecorded region coexist in a passing range of incident beam of information layer at the light source side of the information layer to be recorded, the correction rate of the delay amount of the leading edge pulse and trailing edge pulse can be estimated from the level of the quantity of reflected light.

When limited to a method of recording signals sequentially from the innermost information layer with respect to the light source, the recording conditions of leading edge and trailing edge of each information layer can be simplified to two types.

Embodiment 3

In order to correct the recording condition difference due to difference between optical recording media or difference between optical recording apparatuses, this embodiment proposes a method of determining optimum values by learning the leading edge position and trailing edge position of recording pulse in each information layer.

Figure 6:
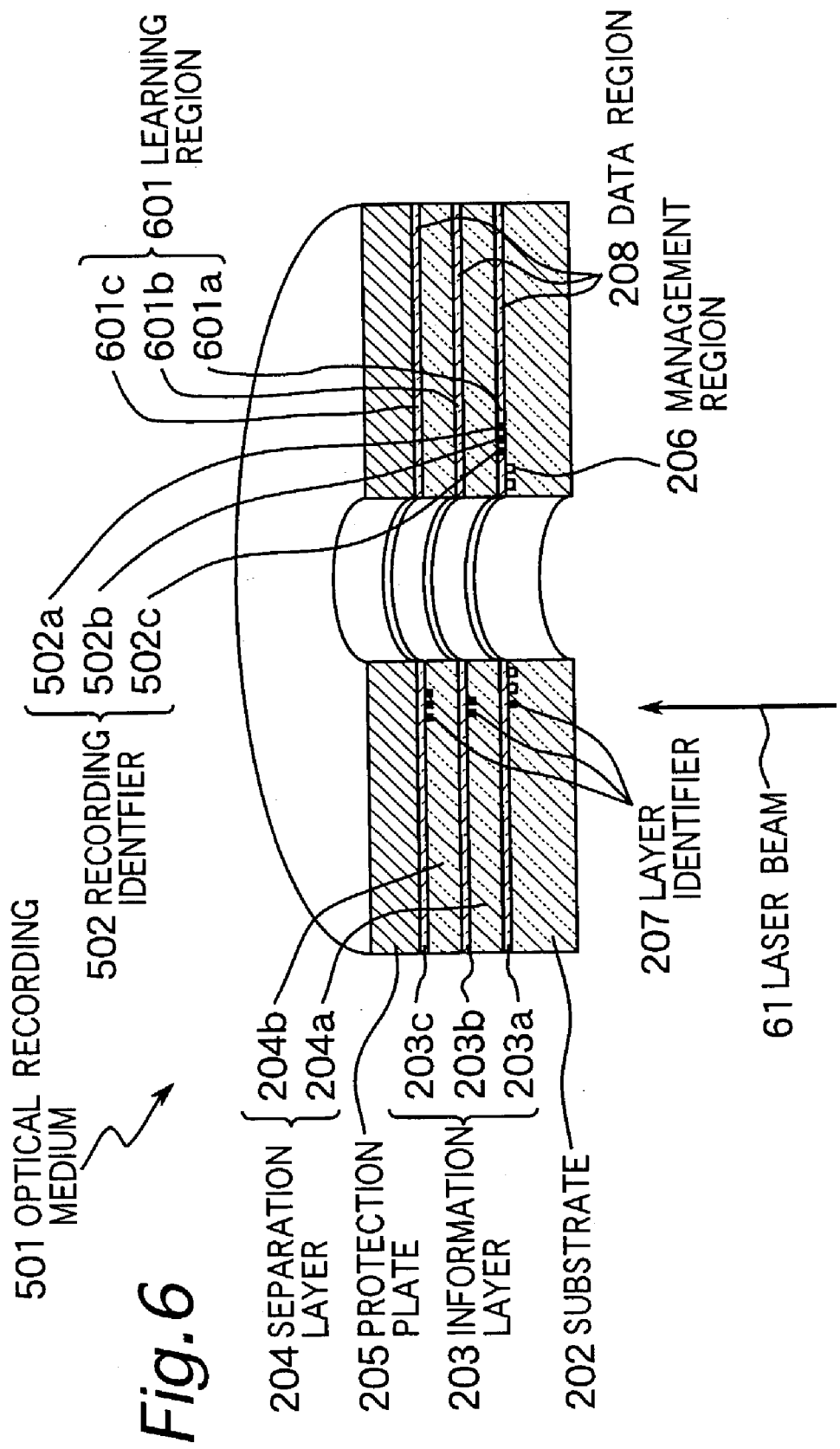
FIG. 6 is a sectional view of optical recording medium in a third embodiment of the present invention.
Figure 8:
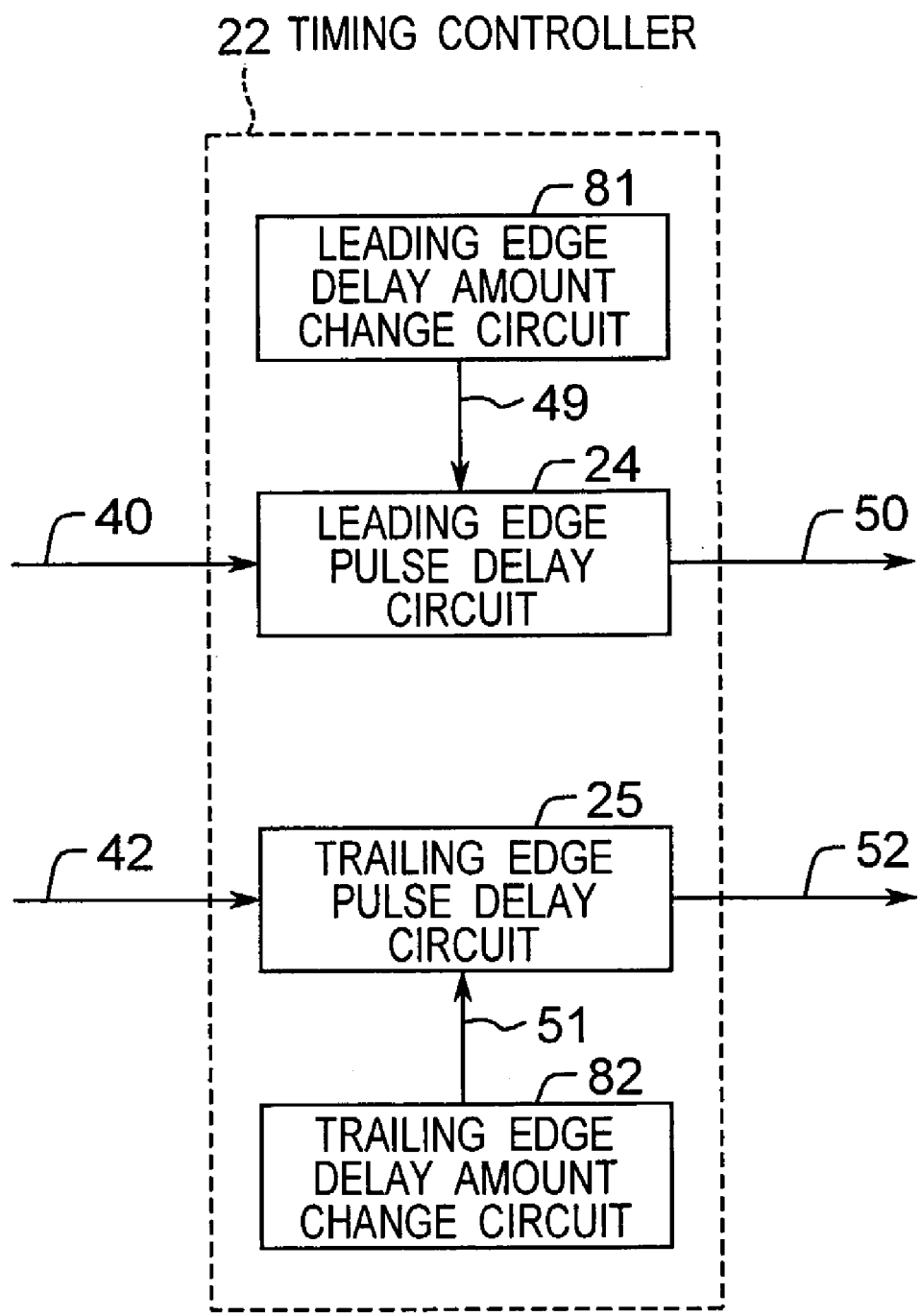
FIG. 8 is a block diagram of a recording apparatus of optical recording medium in the third embodiment of the present invention.

FIG. 6 is a diagram of sectional view of optical recording medium. Learning regions 601 are provided in the information layers 203a, 203b, 203c for determining the optimum values of delay amount of leading edge pulse and trailing edge pulse. A configuration of an apparatus for recording information in an optical recording medium 501 is shown in FIG. 8, in which a leading edge delay amount change circuit 801 is added to the leading edge pulse delay circuit 24 of the timing controller 22 in FIG. 1, and a trailing edge delay amount change circuit 802 is added to the trailing edge pulse delay circuit 25.

Figure 7:
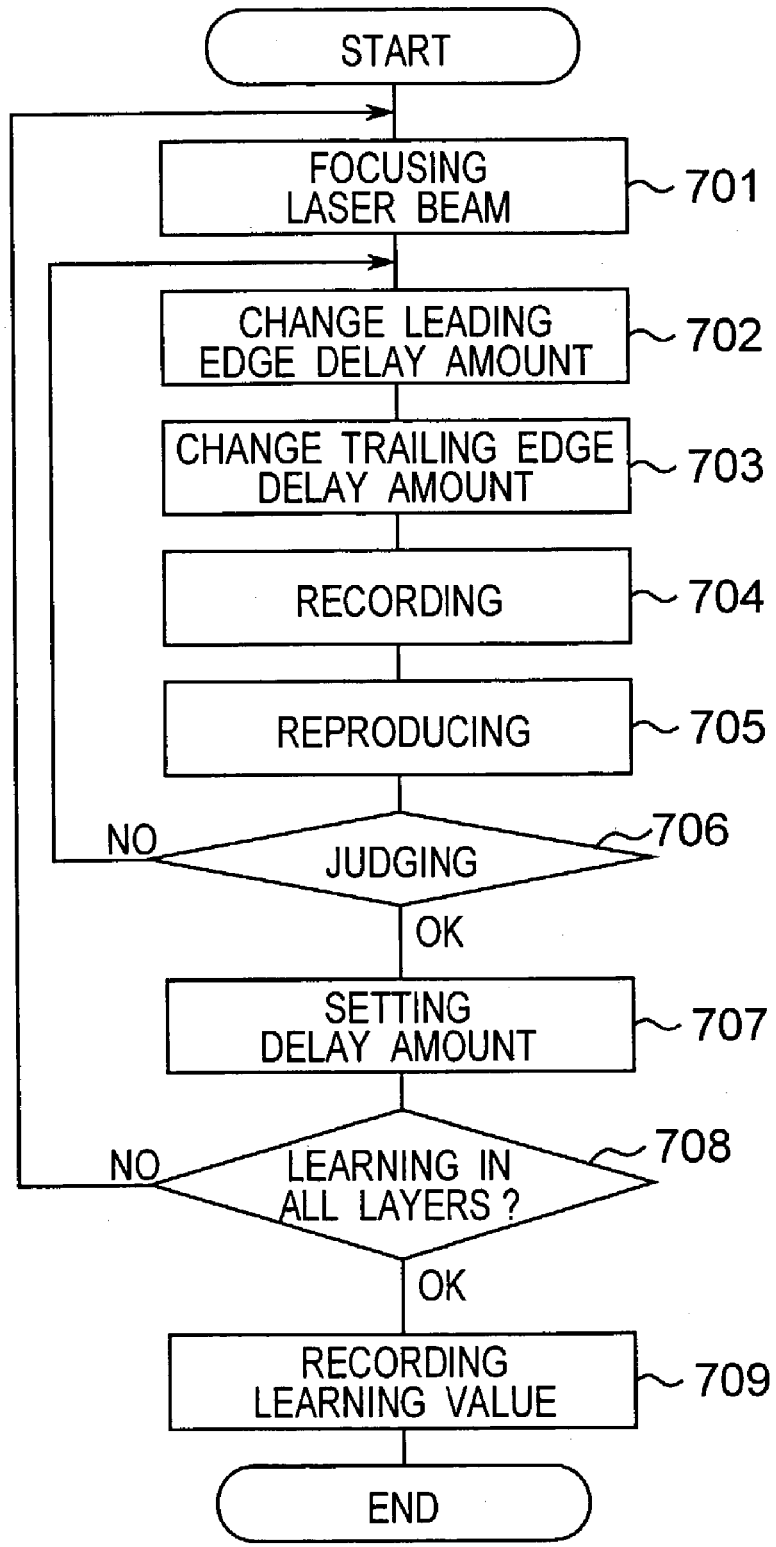
FIG. 7 is a flowchart showing the learning procedure of recording pulse delay amount in a recording method of optical recording medium in the third embodiment of the present invention.

Referring to a flowchart in FIG. 7, we will explain the learning procedure of delay amount of leading edge pulse and trailing edge pulse in each information layer in the optical recording apparatus. At beam emitting step 701, a laser beam is focused on the learning region 601 on the information layer 203 for learning. At leading edge delay amount change step 702, the leading edge delay amount change circuit 801 outputs a delay signal 49 changing discontinuously the delay amount depending on the combination of the recording mark and the space preceding the mark. The leading edge pulse delay circuit 24 outputs a delayed leading edge pulse 50 according to the delay signal 49.

At trailing edge delay amount change step 703, the trailing edge delay amount change circuit 802 outputs a delay signal 51 changing discontinuously the delay amount depending on the combination of the recording mark and the space succeeding the mark. The trailing edge pulse delay circuit 25 outputs a delayed trailing edge pulse 52 according to the delay signal 51. At recording step 704, the laser beam modulated by the recording pulses according to the delayed leading edge pulse 50 and delayed trailing edge pulse 52 discontinuously changed is emitted on the information layer 203, and recording marks are formed. At reproducing step 705, the edge interval of the recording marks and space reproducing signal formed at step 704 is measured.

FIGS. 9A to 9C are diagrams showing the relation of the reproduced signal of recording mark, delay amount, and edge interval. FIG. 9A shows a reproduced signal waveform of recording mark. For example, on the basis of the preceding edge position of 6T mark, the preceding edge interval of 4T mark is measured. The preceding edge position of 4T mark is recorded by changing discontinuously at step 704, and the leading edge interval varies corresponding to the delay amount of the leading edge pulse (FIG. 9B). Further, on the basis of the succeeding edge position of 6T mark, the succeeding edge interval of 4T mark is measured. The succeeding edge position of 4T mark is recorded by changing discontinuously at step 704, and the trailing edge interval varies corresponding to the delay amount of the trailing edge pulse (FIG. 9C).

Identifying step 706 is to determine the optimum delay amounts of leading edge pulse and trailing edge pulse so that the preceding edge interval and succeeding edge interval of reproduction signal may be optimum length as shown in FIGS. 9B and 9C. Step 706 is followed by delay amount setting step 707 of storing the leading edge position set value of the learned information layer in each leading edge condition memory circuit in the leading edge condition selector 12 in FIG. 4 explained in the first embodiment. Similarly, the trailing edge position set value of the learned information layer is stored in each trailing edge condition memory circuit in the trailing edge condition selector 17.

The process from step 701 to step 707 is repeatedly learned in the existing information layers. After learning from step 701 to step 707, at learning value recording step 709, the information of leading edge position set value and trailing edge position set value stored at step 707 is recorded in the management region on the optical recording medium 501. After step 709, the optical recording apparatus is in ready state waiting for recording.

In the procedure shown in FIG. 7, in each information layer of the optical recording medium 501 having a plurality of information layers 203, the leading edge information or trailing edge information may be set to the optimum value corresponding to the combination of the recording mark, immediately preceding space and immediately succeeding space.

It is preferred to record the recommended condition determined in the manufacturing process of the optical recording medium in the management region 206 on the optical recording medium 501. In this case, preferably, the starting value of the delay amount at delay amount change step 702 should be used as the leading edge starting position set value and trailing edge starting position set value recorded in the management region 206. In this case, learning is started from the interval closer to the optimum edge interval, and the learning time can be shortened by limiting the changing range of the delay amount.

In this case, the information of the leading edge position set value and trailing edge position set value stored at delay amount setting step 707 is recorded on the optical recording medium, and in this case. Furthermore, when the optical recording medium 501 is loaded again in the optical recording apparatus, by setting the delay mount of the leading edge position and delay amount of the trailing edge position according to the recorded leading edge information and trailing edge information, it is possible to record nearly at the optimum edge interval. As a result, the learning time is further shortened, or may be even eliminated.

In this learning, moreover, by executing in the information layer at the closest side to the light source and in the information layer at the remotest side from the light source, learning in other information layers can be omitted. In this case, learning results in other information layers may be set by interpolating from the learning results of the information layers that actually carried out the learning step. In this case, it is not needed to execute learning in all information layers, and the learning time can be shortened.

This learning may be also executed depending whether the information layer of the light incident side of the information layer to be recorded is in recorded state or unrecorded state. In this case, depending on the recorded state of the information layer at light incident side, the intensity of the laser beam reaching the subsequent information layers varies, and the recording condition of each information layer changes. Since the delay amount is learned corresponding to the combination of recorded state of each information layer, optimum leading edge position set value and trailing edge position set value corresponding to the recorded state of each information layer can be set, so that more accurate learning is possible.

After recording and learning corresponding to the recorded state of the information layer closer to the light source than the information layer to be recorded, if the quantity of reflected light of the information layer to be recorded is changed, learning may be executed again. Due to change in recorded state of information layer at light incident side, a recorded state region and an unrecorded state region may coexist, and the intensity of the laser beam reaching the subsequent information layers may be changed. In such a case, too, optimum leading edge position set value and trailing edge position set value corresponding to the intensity of the laser beam reaching the information layer can be set, so that further accurate learning is possible.

Embodiment 4

A recording method of optical recording medium according to a fourth embodiment of the present invention is explained. In this recording method of optical recording medium, as compared with the recording method of optical recording medium in the third embodiment, it includes an additional step, that is, learning step is executed in selected information layers out of the plurality of information layers, and optimum values of recording start position and recording end position about the information layers skipping the learning step are calculated on the basis of the obtained learning results. According to this recording method of optical recording medium, the learning step is executed only in selected information layers, not in all information layers, and the required time for learning step can be shortened.

In this optical recording medium having a plurality of information layers, we will explain the reason why the optimum delay a mount of other information layers can be calculated from the learning results of the selected information layers. Generally, in the case of an optical recording medium having multiple information layers, optical properties of information layers such as reflectivity, transmissivity and absorption rate, or thermal properties such as heat conduction, temperature elevation and cooling may vary continuously or discontinuously in laminated information layers. In the optical recording medium having such plurality of information layers, by learning in selected information layers out of all information layers, the optimum delay amount of other information layers can be predicted as continuously or discontinuously changing values from the learning results of the selected information layers.

Figure 10:
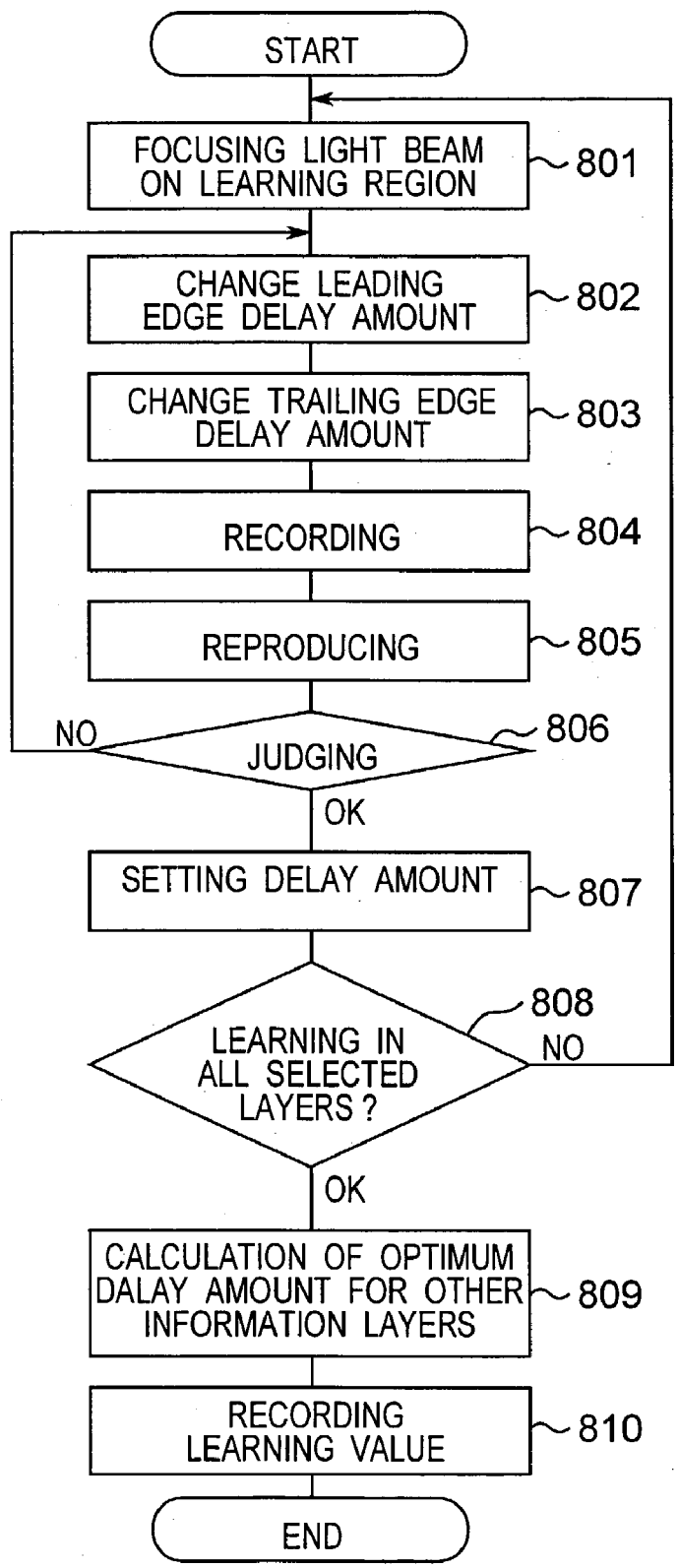
FIG. 10 is a flowchart showing the learning procedure of recording pulse delay amount in a recording method of optical recording medium in a fourth embodiment of the present invention.
Figure 11:
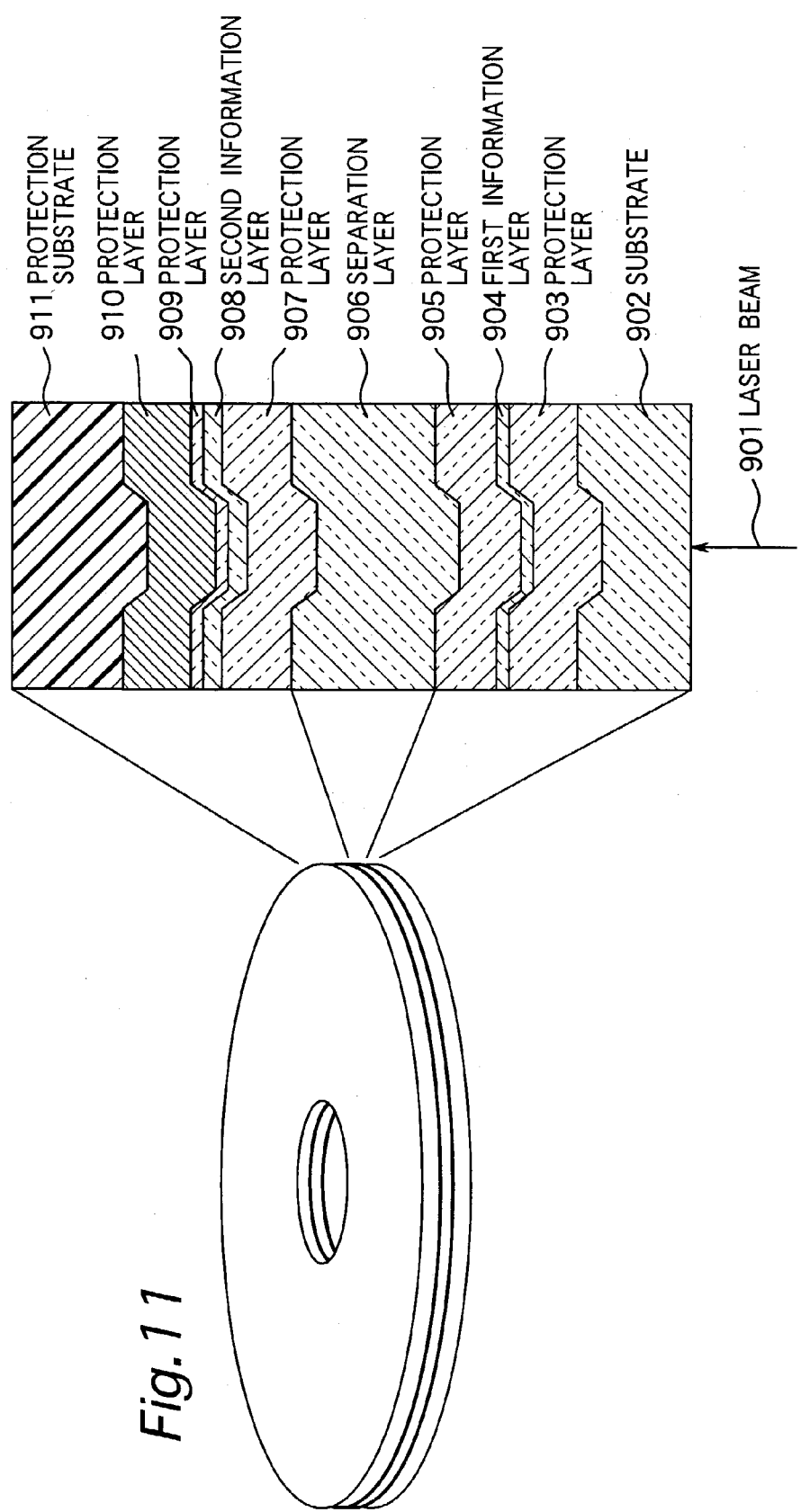
FIG. 11 is a sectional view of a conventional optical recording medium.

Referring to a flowchart in FIG. 10, we will explain this recording method of optical recording medium. In this recording method of optical recording medium, the example is the optical recording medium 501 having three information layers 203a, 203b, 203c shown in FIG. 6. In this recording method, out of the three information layers, the information layer 203a of the remotest side from the light source and the information layer 203a at the closest side to the light source are selected for learning step. Of the following steps, steps 801 to 807 are substantially same as step 701 to 707 in the third embodiment.

(1) A laser beam is focused on the learning region (801).

(2) The leading edge delay amount change circuit 81 outputs a delay signal 49 discontinuously changing the leading edge delay amount depending on the combination of the recording mark length and the length of space preceding the mark. Then the leading edge pulse delay circuit 24 outputs a delayed leading edge pulse 50 according to the delay signal 49 (802).

(3) The trailing edge delay amount change circuit 82 outputs a delay signal 51 discontinuously changing the trailing edge delay amount depending on the combination of the recording mark length and the length of space succeeding the mark. Then the trailing edge pulse delay circuit 25 outputs a delayed trailing edge pulse 52 according to the delay signal 51 (803).

(4) The laser beam modulated by the recording pulses 28 according to the delayed leading edge pulse 50 and delayed trailing edge pulse 52 obtained at each step described above is emitted on the information layer 203*c*, and recording marks and spaces are formed (804).

(5) The formed recording marks and spaces are read, and a reproduction signal is obtained (805). From this reproduction signal, the leading edge interval between the adjacent recording mark leading edges and the trailing edge interval between the trailing edges can be measured.

(6) The leading edge interval and trailing edge interval is identified to be in a range of optimum length or not respectively (806). As a result, corresponding optimum leading edge delay amount and trailing edge delay amount are obtained in each combination of recording mark length and space preceding and succeeding the mark. The recording mark length, length of space preceding the mark, and combination of leading edge delay amount are leading edge position set values, and the recording mark length, length of space succeeding the mark, and combination of trailing edge delay amount are trailing edge position set values.

(7) Then, in each leading edge condition memory circuit of the leading edge condition selector 12, the above-mentioned leading edge position set value of the learning result relating to the information layer 203*c* is stored. Similarly, in each trailing edge condition memory circuit of the trailing edge condition selector 17, the above-mentioned trailing edge position set value is stored (807).

(8) It is identified if the procedure from step 802 to step 807 is finished in all selected information layers (808). In this example, the information layer 203*a* is not learned yet, and going back to step 802, learning of the information layer 203*a* is started. When learning is finished in all selected information layers, the process goes to next step.

(9) On the basis of the above-mentioned learning results of the selected information layers 203*a*, 203*c* out of all information layers, the optimum leading edge delay amount and trailing edge delay amount for other information layer 203*b* are calculated (809). At this calculating step 809, various methods of calculation are usable. In this example, by the interpolation method between the learning result from the information layer 203*a* closest to the light source and the learning result from the information layer 203*c* remotest from the light source, the leading edge delay amount and trailing edge delay amount of the intermediate information layer 203*b* are calculated. For example, in the combination of the same recording mark length and length of space preceding the mark, the intermediate value of the leading edge delay time obtained in the information layer 203*a* and the leading edge delay time obtained in the information layer 203*c* is calculated as the leading edge delay time of the information layer 203*b*. Herein, the information layers 203*a*, 203*b*, 203*c* are supposed to change continuously in the optical characteristics and thermal characteristics.

(10) In each one of the information layers 203*a*, 203*b*, 203*c*, the leading edge position set value and trailing edge starting position are recorded on the management region 206 of the optical recording medium 501 (810). At this step 802, the optimum leading edge delay amount and trailing edge delay amount can be determined by learning and interpolation in all information layers 203*a*, 203*b*, 203*c*, and can be respectively recorded as the leading edge position set value and trailing edge position set value.

Thus, by skipping the learning step in the information layer 203*b*, the time required for learning step can be shortened. If the optical recording medium is composed of four or more information layers, the set value of the delay amount of the recording pulse of the information layers at intermediate positions can be set by equally distributing the set values of each delay amount from the learning result from the information layer at the light source side and the learning result from the information layer remotest from the light source.

In the embodiment, as the method of interpolation, the learning results of two selected information layers are interpolated linearly, and the intermediate value is used as the optimum delay amount for the information layer at the intermediate position, but the method is not limited to this alone. For example, learning results of recording pulses in each information layer at intermediate position are measured preliminarily, and the interpolation coefficient (interpolation formula) may be calculated from the measured results of the characteristics. Afterwards, when executing the learning step in a multi-layer optical recording medium of similar type, it is possible to interpolate by using this interpolation coefficient (interpolation formula). In this case, by recording the obtained learning results and interpolation coefficient in and the like the recording apparatus of optical recording medium, the learning step can be executed in a multi-layer optical recording medium of similar type.

When composed of two information layers only learning steps are executed preliminarily in the information layer at light incident side and the information layer at the remoter side. From the learning result of one information layer, the interpolation coefficient is determined about the optimum delay amount of other information layer. Afterwards, when executing the learning step in a similar optical recording medium, by executing the learning step in one information layer only, the optimum delay amount of other information layer can be interpolated. That is, it is enough to execute the learning procedure only in one information layer of the two information layers, the time required for learning procedure can be shortened.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

The invention claimed is:

1. An optical recording medium comprising:
   a substrate;
   a protection plate; and
   a plurality of information layers sandwiched between said substrate and said protection plate, for recording information signals as a length of a mark and a length of a space between two marks, the mark being formed when irradiated by light received through said substrate,
wherein said plurality of information layers have a management region recording a leading edge recording condition and a trailing edge recording condition,
wherein the leading edge recording condition is used to change a recording start position for forming a leading edge of the mark, the leading edge recording condition is depending on which information layer is recorded,
wherein the trailing edge recording condition is used to change a recording end position for forming a trailing edge of the mark, the trailing edge recording condition is depending on which information layer is recorded.

2. An optical recording medium according to claim 1, wherein said leading edge recording condition includes a condition depending on the length of said mark and the length of the space preceding said mark, and said trailing edge recording condition includes a condition depending on the length of said mark and the length of the space succeeding said mark.

3. An optical recording medium according to claim 1, wherein said leading edge recording condition and said trailing edge recording condition includes a condition of whether data have been recorded or not in one of said information layers positioned at light incident side.

4. An optical recording medium according to claim 1, wherein said management region is provided in one of said plurality of information layers.

5. An optical recording medium according to claim 4, wherein said management region is provided in one of said information layers at light incident side.

6. An optical recording medium according to claim 1, wherein each of said plurality of information layers has a identifier for information layer.

7. An optical recording medium according to claim 1, wherein each of said plurality of information layers has a recording identifier on whether data have been recorded or not therein.

8. An optical recording medium according to claim 7, wherein said recording identifier is recorded in said management region.

9. A recording method of optical recording medium for recording information signals in an information layer as a length of mark and a length of a space between two marks, the mark being formed when irradiated by light received, the recording method comprising:
    setting a leading edge starting condition used to change a recording start position for forming a leading edge of the mark depending on the length of the mark, the length of the space preceding said mark, and the information layer to be recorded;
    setting a trailing edge starting condition used to change a recording end position for forming a trailing edge of the mark depending on the length of said mark, the length of the space succeeding the mark, and the information layer to be recorded; and
    recording information signals by forming marks when irradiated by light received through the information layer after setting the leading edge starting condition and setting the trailing edge starting condition.

10. A recording method of optical recording medium according to claim 9, wherein said recording start and end positions are changed for recording depending on a recorded or unrecorded state of the upper information layer positioned at light incident side.

11. A recording method of optical recording medium according to claim 10, wherein if recorded state and unrecorded state coexist in said upper information layer, the recording start position is set as a position between the recording start positions in unrecorded state and in recorded state, and the recording end position is set as a position between the recording end positions in unrecorded state and in recorded state.

12. A recording method of optical recording medium according to claim 10, wherein said recording start position and said recording end position are corrected based on quantity of light reflected from the upper information layer positioned at light incident side of the information layer to be recorded.

13. A recording apparatus of optical recording medium having a plurality of information layers for recording information signals as a length of a mark and a length of a space between two marks, the mark being formed when irradiated by light received, the recording apparatus comprising:
    a layer detector circuit detecting which one of said plurality of information layers is an information layer to be recorded;
    a basic pulse generator generating a pulse of a predetermined width at a leading edge position of a mark to be formed, generating pulse at the middle of said mark, and generating a pulse of a predetermined width at a trailing edge position of said mark;
    a data length detector composed of a recording mark detector circuit detecting a length of the mark, a preceding space detector circuit detecting the length of a space preceding said mark, a succeeding mark detector circuit detecting the length of a mark succeeding said mark, and a succeeding space detector circuit detecting the length of a space succeeding said mark;
    a timing controller composed of a leading edge pulse delay circuit generating a delayed leading edge pulse by setting a delay amount of the leading edge pulse from an output signals of said recording mark detector circuit, said preceding space detector circuit and said layer detector circuit, and a trailing edge pulse delay circuit generating a delayed trailing edge pulse by setting a delay amount of the trailing edge pulse from an output signals of said recording mark detector circuit, said succeeding space detector circuit and said layer detector circuit;
    a pulse synthesizer forming a recording pulse by synthesizing said delayed leading edge pulse signal, said intermediate pulse signal, and said delayed trailing edge pulse signal; and
    a laser driver modulating an intensity of a beam on the basis of the recording pulse.

14. A recording apparatus of optical recording medium according to claim 13, further comprising a timing controller comprising:
    a recording identifying circuit detecting a recorded state of the upper information layer positioned at light incident side;
    a leading edge pulse delay circuit generating a delayed leading edge pulse by setting a delay amount of said leading edge pulse from an output signal of said recording mark detector circuit, said preceding space detector circuit, said layer detector circuit, and said recording identifying circuit, and
    a trailing edge pulse delay circuit generating a delayed trailing edge pulse by setting a delay amount of said trailing edge pulse from an output signal of said recording mark detector circuit, said succeeding space detector circuit, said layer detector circuit, and said recording identifying circuit.

15. A recording apparatus of optical recording medium according to claim 13, further comprising selector selecting the delay amount of leading edge pulse and delay amount of trailing edge pulse, from the leading edge starting information and trailing edge starting information recorded in said management region, according to the identifying result of said layer detector circuit.

16. A recording apparatus of optical recording medium according to claim 15, wherein said layer detector circuit detects the layer identifier for identifying the information layer.

17. A recording apparatus of optical recording medium according to claim 14, further comprising selector selecting the delay amount of leading edge pulse and delay amount of trailing edge pulse, from the leading edge starting information and trailing edge starting information recorded in said management region, according to the identifying result of said recording identifying circuit.

18. A recording apparatus of optical recording medium according to claim 17, wherein said recording identifying circuit detects the recording identifier for distinguishing whether the information layer is in recorded state or in unrecorded state.

19. A recording apparatus of optical recording medium according to claim 13, further comprising a detector detecting a quantity of light reflected from the information layer to be recorded, wherein the delay amount of leading edge pulse and delay amount of trailing edge pulse are determined based on the detecting result obtained by said reflected light quantity detecting means.

* * * * *